(12) United States Patent
Dowie

(10) Patent No.: US 12,346,353 B2
(45) Date of Patent: Jul. 1, 2025

(54) GEOGRAPHICALLY REFERENCING AN ITEM

(71) Applicant: FoundAt Pty Ltd, Gwelup (AU)

(72) Inventor: Leigh James Dowie, Gwelup (AU)

(73) Assignee: Foundat Pty Ltd, Gwelup (AU)

( * ) Notice: Subject to any disclaimer, the term of this patent is extended or adjusted under 35 U.S.C. 154(b) by 29 days.

(21) Appl. No.: 17/767,575

(22) PCT Filed: Oct. 7, 2020

(86) PCT No.: PCT/AU2020/051076
§ 371 (c)(1),
(2) Date: Apr. 8, 2022

(87) PCT Pub. No.: WO2021/068031
PCT Pub. Date: Apr. 15, 2021

(65) Prior Publication Data
US 2024/0104120 A1    Mar. 28, 2024

(30) Foreign Application Priority Data
Oct. 11, 2019 (AU) .................................. 2019903823

(51) Int. Cl.
*G06F 16/29* (2019.01)
*G01S 19/40* (2010.01)
*G06F 16/909* (2019.01)

(52) U.S. Cl.
CPC ............... *G06F 16/29* (2019.01); *G01S 19/40* (2013.01); *G06F 16/909* (2019.01)

(58) Field of Classification Search
CPC ...................................................... G01S 19/40
See application file for complete search history.

(56) References Cited

U.S. PATENT DOCUMENTS

| | | |
|---|---|---|
| 6,662,016 B1 | 12/2003 | Buckham et al. |
| 2007/0258642 A1 | 11/2007 | Thota |

(Continued)

FOREIGN PATENT DOCUMENTS

| | | |
|---|---|---|
| WO | WO-2015/048434 A1 | 4/2015 |
| WO | WO-2017/032920 A1 | 3/2017 |

OTHER PUBLICATIONS

Extended European Search Report in EP Application No. 20873529.0 dated Jan. 3, 2024, 12 pages.

(Continued)

*Primary Examiner* — Edward Park
(74) *Attorney, Agent, or Firm* — MARSHALL, GERSTEIN & BORUN LLP

(57) ABSTRACT

A system for geographically referencing an item is disclosed. The system comprises at least one processor which is operable to make an item searchable by geographical reference information (GRI), thereby creating a georeferenced item. A database search method is described. The method includes the ability to apply GRI, which may be in the form of any point in space, one dimensional, two dimensional or three dimensional shape, to any type of Native Data File, even where the Native Data File may not ordinarily support the inclusion of any form of geo location data. This is achieved through the association of the Native Data File with a file type that does support geolocation data, such as an image type file. When searching the database, an additional filter may be applied that utilizes Geographical Search Parameters (GSP) to confine the successful search results to within a certain geographical area.

29 Claims, 11 Drawing Sheets

(56) References Cited

U.S. PATENT DOCUMENTS

| | | | | |
|---|---|---|---|---|
| 2011/0276924 | A1* | 11/2011 | Voonna | H04W 92/08 |
| | | | | 709/204 |
| 2013/0187952 | A1* | 7/2013 | Berkovich | H04N 1/32101 |
| | | | | 345/633 |
| 2014/0095509 | A1 | 4/2014 | Patton | |
| 2014/0210856 | A1* | 7/2014 | Finn | H04N 13/275 |
| | | | | 345/633 |
| 2015/0081211 | A1* | 3/2015 | Zeng | G01S 19/42 |
| | | | | 701/446 |
| 2015/0121535 | A1 | 4/2015 | Fiss | |
| 2015/0324099 | A1* | 11/2015 | Tang | G06Q 10/00 |
| | | | | 715/716 |
| 2016/0066157 | A1 | 3/2016 | Noorshams et al. | |
| 2016/0110381 | A1 | 4/2016 | Chen et al. | |
| 2017/0060888 | A1 | 3/2017 | Al Hassanat et al. | |
| 2018/0174279 | A1* | 6/2018 | Anhut | G06T 5/80 |
| 2018/0300341 | A1 | 10/2018 | Hadar et al. | |
| 2019/0020978 | A1 | 1/2019 | Finschi et al. | |
| 2020/0143311 | A1* | 5/2020 | Zhang | G06Q 10/083 |

OTHER PUBLICATIONS

Supplementary Partial European Search Report in EP Application No. 20873529.0 dated Aug. 28, 2023, 12 pages.

Search Report in International Application No. PCT/AU2020/051076 dated Jan. 5, 2021, 8 pages.

Written Opinion in International Application No. PCT/AU2020/051076 dated Jan. 5, 2021, 7 pages.

Written Opinion in International Application No. PCT/AU2020/051076 dated Sep. 6, 2021, 7 pages.

Written Opinion in International Application No. PCT/AU2020/051076 dated Dec. 1, 2021, 4 pages.

International Preliminary Report on Patentability in International Application No. PCT/AU2020/051076 dated Jan. 13, 2022, 8 pages.

\* cited by examiner

GEOGRAPHICALLY REFERENCING AN ITEM

TECHNICAL FIELD

The present invention relates generally to geographically referencing an item.

The present invention will be described with particular reference: to geographically referencing an item, which may be an electronic, digital, or virtual item, in a store comprising an electronic database incorporating information from a geographical coordinate system; to a tool for use in geographically referencing the item; and to establishing an anchor for computer generated perceptual information (such as, for example, Augmented Reality).

However, it will be appreciated that the invention is not limited to these particular fields of use, and it may be used in respect of other items, and for additional and/or alternative purposes.

BACKGROUND ART

Any discussion of the background art throughout the specification should in no way be considered as an admission that such background art is prior art, nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the Applicant reserves the right to challenge the accuracy and pertinence of the cited documents. It will be clearly understood that, although a number of prior art publications may be referred to herein, this reference does not constitute an admission that any of these documents forms part of the common general knowledge in the art, in Australia or in any other country.

Since the digital revolution, the core technology and approach to data storage has remained largely unchanged and, generally speaking, has only experienced small incremental innovation.

The availability and volume of data, however, has continued to increase at an exponential rate. In 2018 the sum of all data in the world was estimated to be 18 Zettabytes (source International Data Corporation). A Zettabyte is approximately 1 Billion Terabytes. By 2025, this number is expected to reach 175 Zettabytes (source www.bernardmarr.com).

Despite the rapid growth of data, the tools available for individuals and corporations alike to capture, organise and share their data have not evolved anywhere near as quickly. If anything, we have seen a divergence in our options with a multitude of platforms being developed to deal with small components of our data. Take for instance the number of social media platforms that are now being used to share information of all forms, including Facebook, Twitter, Instagram, LinkedIn and Snapchat.

With the vast amount of electronic data being created and stored in recent times, many individuals and companies often struggle to accurately categorise and file or save the data in a form that will be easily accessible or discoverable in the future, especially when considering factors such as varying computer literacy skills, variability in the use of associated search terms and understanding of any predefined requirements, that some users may exhibit. Typical electronic databases allow users to search for files or records that have been saved or stored therein via search fields or terms in a search query including, such as, for example, file name, date created, file type, creator, etc. Despite the vast number of search fields available, users can often still experience difficulty in finding the exact file or record that they are looking for, even if the correct naming conventions of the relevant database, etc. have been followed in the search query.

Another available (information) field that is becoming common is for certain file types to include geographical coordinate information, based upon the location that, or at which, the file was generated or created, etc. Image files are a good example of this, whereby modern cameras (such as a camera of a personal mobile device, for example) are operable to record the geographical location at which a photograph was taken by the camera. This geographical information is usually obtained from an internal Global Positioning System (GPS) receiver within the camera device and the information is usually stored for the file in the form of latitude, longitude and elevation. There are, however, a number of other ways that the necessary geographical information can be obtained, such as by utilizing a Wi-Fi Positioning System (WPS). The potential advantages available with the inclusion of geographical or geo-referenced information are often not fully realized for the specific file types that have this available, however, as the user is often still required to locate the file using traditional search techniques and only once the file has been successfully located are they able to view the information regarding its geographical location.

Technical difficulties can be encountered in determining the accurate geographic location of a personal mobile device. Particularly, this can often be problematic in complex industrial environments, as GPS signals are not reliable inside a structure, and other forms of location services, such as Bluetooth Beacons and WIFI location can also be unreliable, especially if there is a lot of steel, in the environment that is reflecting signals.

An Augmented Reality (AR) anchor is used to integrate a virtual world with the real world and describes the location of a physical object in the real world.

AR anchors typically rely upon a three-dimensional (3D) mesh that is generated from the in-built camera within a user's personal mobile device. This 3D mesh is only approximately located within the global coordinate system given that current systems rely upon GPS location and the mobile data network (for example, 4G) to provide an approximate location. In practice, this results in a geographical location for the 3D mesh that may not even be accurate to +/−50 m, which means that current AR anchors may incorrectly associate an anchor with a particular environment, given that or if it has a similar structure (appearance) and is roughly located in the same region. For example, an AR anchor that is based upon a 3D mesh generated at one level of a stair well in a building structure, can often incorrectly appear at levels above and below the actual level that the anchor was placed. This is due to the fact that software of the personal mobile device is operable to recognise a particular structure (for example, shape of walls, doors and stairs etc.) and based upon a very inaccurate geo-location, assumes that the user of the mobile device is standing on the same level at which the AR anchor was placed. Other examples of inaccurate AR anchor location can occur in rows of shelving in supermarkets or warehouses, etc., where the geometric shapes of each isle can be quite similar, therefore anchors that are placed in one isle can incorrectly appear in adjacent isles.

It is against this background that the present invention has been developed.

SUMMARY OF INVENTION

It is an object of the present invention to overcome or ameliorate at least one or more of the disadvantages of the prior art, to provide a useful alternative, and/or to provide consumers with a commercial choice.

Other objects and advantages of the present invention will become apparent from the following description, taken in connection with the accompanying drawings, wherein, by way of illustration and example, at least one preferred embodiment of the present invention is disclosed.

According to a first broad aspect of the present invention, there is provided a system for geographically referencing an item, the system comprising:

at least one processor; and
storage storing electronic program instructions for controlling the at least one processor;
wherein the at least one processor is operable, under control of the electronic program instructions, to:
make an item searchable by geographical reference information (GRI), thereby creating a georeferenced item.

Optionally, to make the item searchable by GRI, the at least one processor is further operable, under control of the electronic program instructions, to: add the item to a store and insert the GRI for the item into a field within the store.

In an embodiment, the store may comprise object storage for unstructured data, and may be in the form of Binary Large Object (Blob) storage. In such an implementation, the at least one processor may be operable, under control of the electronic program instructions, to: save the item in the Blob storage and then insert the GRI into a field within a database of the Blob storage.

Optionally, to make the item searchable by GRI, the at least one processor is further operable, under control of the electronic program instructions, to: detect the item.

Optionally, to make the item searchable by GRI, the at least one processor is further operable, under control of the electronic program instructions, to determine whether the item can or cannot hold geographical reference information (GRI); and
if it is determined that the item can hold GRI, add GRI to the item to create a georeferenced item.

Optionally, if it is determined that the item cannot hold GRI, then the at least one processor is further operable, under control of the electronic program instructions, to: form an association between the item and a second item that can hold GRI, and then add GRI to the second item to create the georeferenced item.

Optionally, the at least one processor is further operable, under control of the electronic program instructions, to: add the georeferenced item to a store. This may be implemented by, for example, an added field by Blob storage that can hold the GRI, or storing the GRI within metadata for a particular file of the item.

The georeferenced item may be searchable in the store via the added GRI.

Optionally, the store comprises a database.

Optionally, the making, and/or the optional detecting, occurs on creation of the item, and the GRI comprises information identifying a physical location and/or time of creation of the item. In embodiments, the making, and/or the optional detecting, occurs after creation of the item, at a later time and/or date for example.

Optionally, the item is an electronic, digital, or virtual item, comprising one or more of: data; a file; an email; an image; a social media post; a document; a record of electronic transaction; a link to an external database.

The GRI may comprise geographical reference data. Such data may be in any form, including one or more of latitude, longitude, and height above sea level, and in any coordinate system, including Geocentric Datum of Australia (GDA2020), for example.

Adding the GRI may comprise applying the GRI, which may comprise applying one or more of single point geographical reference data but also complex 2D and 3D shape files to each item (of data, for example).

The georeferenced item may be searchable in the store by a search query, which may comprise one or more geographical search parameters (GSP).

GSP may include one or more of single point geographical reference data but also the application of similarly complex 2D and 3D shape files.

Geographical searching may be carried out based upon the intersection of GRI and GSP.

Optionally, the system further comprises an input means, and the at least one processor is further operable, under control of the electronic program instructions, to: generate and display via a display a user interface operable to allow a user to control the input means to capture input comprising data and/or information.

The input means may comprise at least one sensor, which may be part of a sensor system or a set of sensors.

Individual sensors within the set of sensors may comprise: a motion sensor; a gyroscope sensor; a gravity sensor, an infra-red sensor; a depth sensor; a three dimensional imaging sensor; an inertial sensor; a Micro-Electromechanical (MEMS) sensor; an orientation sensor; an imaging means; an acceleration sensor; a direction sensor; a position sensor; a light source sensor; a sound recording means.

The display, user interface and input means may be integrated, in a touchscreen for example. Alternatively, they may be discrete.

In an embodiment, the input comprises user instructions which are input by a user via the input means. The user instructions may comprise a command to perform an action, activity, or function, in which case the controller is operable, under control of the electronic program instructions, to perform the action, activity, or function, according to the received user instructions.

In an embodiment, the system comprises a marker installed at a physical location, the marker comprising geographical information identifying the physical location, wherein the at least one processor is further operable, under control of the electronic program instructions, to: receive input comprising the geographical information, and process the input to determine the GRI.

The geographical information may relate to a global coordinate system, and may be in the form of measures of one or more of latitude, longitude, and height relative to sea level to specify the physical location.

The geographical information may be embedded in the marker.

The input means may be operable to read or otherwise communicate with the marker to receive the geographical information as input therefrom.

In an embodiment, the electronic program instructions comprise software.

The system may be implemented in a device. The device may be a mobile communication device, in which case it may comprise a smartphone, notebook/tablet/desktop computer, a camera, or portable media device, having the software installed thereon. The software may be provided as a software application downloadable to the device, and/or running on servers and/or the cloud as a service.

Preferably, operations performed by the system occur automatically, without requiring human intervention.

According to a second broad aspect of the present invention, there is provided a method for geographically referencing an item, the method comprising:
storing electronic program instructions for controlling at least one processor; and
controlling the at least one processor via the electronic program instructions to:
make an item searchable by geographical reference information (GRI), thereby creating a georeferenced item.

Optionally, to make the item searchable by GRI, the method further comprises controlling the at least one processor via the electronic program instructions, to: add the item to a store and insert the GRI for the item into a field within the store.

In an embodiment, the store may comprise object storage for unstructured data, and may be in the form of Binary Large Object (Blob) storage. In such an implementation, the method may comprise controlling the at least one processor via the electronic program instructions, to: save the item in the Blob storage; and insert the GRI into a field within a database of the Blob storage.

Optionally, to make the item searchable by GRI, the method further comprises controlling the at least one processor via the electronic program instructions, to: detect the item.

Optionally, to make the item searchable by GRI, the method further comprises controlling the at least one processor via the electronic program instructions, to:
determine whether the item can or cannot hold geographical reference information (GRI); and
if it is determined that the item can hold GRI, add GRI to the item to create a georeferenced item.

Optionally, if it is determined that the item cannot hold GRI, then the method further comprises controlling the at least one processor via the electronic program instructions, to: form an association between the item and a second item that can hold GRI, and add GRI to the second item to create the georeferenced item.

Optionally, the method further comprises controlling the at least one processor via the electronic program instructions, to: add the georeferenced item to a store. This may be implemented by, for example, an added field by Blob storage that can hold the GRI, or storing the GRI within metadata for a particular file of the item.

The georeferenced item may be searchable in the store via the added GRI.

According to a third broad aspect of the present invention, there is provided a method for determining a position of a mobile device, the mobile device firstly at or near a marker installed at a physical location, the marker comprising geographical information identifying the physical location, and the mobile device secondly moved away from the marker, the method comprising:
storing electronic program instructions for controlling at least one processor; and
controlling the at least one processor via the electronic program instructions to:
when the mobile device is at or near the marker, receive and process input comprising the geographical information to determine a first position of the mobile device;
when the mobile device is moved away from the marker, receive input comprising sensed movement of the device from the first position; and
process the sensed movement to determine a second position of the mobile device, relative to the first position, on the basis of the input sensed movement.

According to a fourth broad aspect of the present invention, there is provided a mobile device implementing a method according to the third broad aspect of the present invention as hereinbefore described.

According to a fifth broad aspect of the present invention, there is provided a system implementing a method according to the third broad aspect of the present invention as hereinbefore described.

According to a sixth broad aspect of the present invention, there is provided a computer-readable storage medium on which is stored instructions that, when executed by a computing means, causes the computing means to perform the method according to the second or third broad aspects of the present invention as hereinbefore described.

According to a seventh broad aspect of the present invention, there is provided a computing means programmed to carry out the method according to the second or third broad aspects of the present invention as hereinbefore described.

According to an eighth broad aspect of the present invention, there is provided a data signal including at least one instruction being capable of being received and interpreted by a computing system, wherein the instruction implements the method according to the second or third broad aspects of the present invention as hereinbefore described.

According to a ninth broad aspect of the present invention, there is provided a device for geographically referencing an item comprising a system according to the first broad aspect of the present invention as hereinbefore described.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

BRIEF DESCRIPTION OF THE DRAWINGS

Notwithstanding any other forms which may fall within the scope of the present invention, in order that the invention may be more fully understood and put into practice, preferred embodiments of the invention will now be described, by way of example only, with reference to the accompanying drawings, in which.

DEFINITIONS

Figure 1:
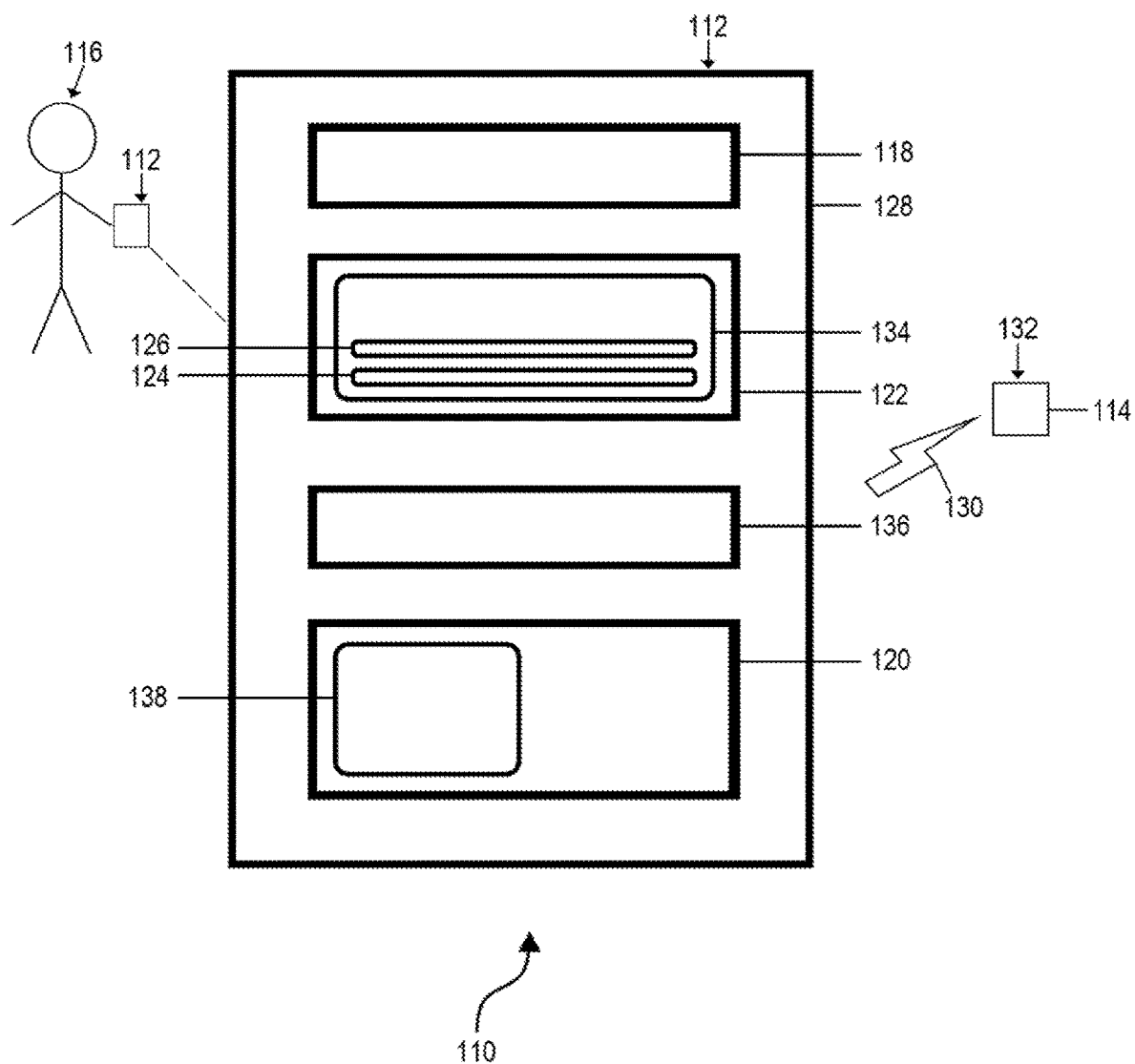
FIG. 1 depicts a schematic diagram of an embodiment of a device in accordance with an aspect of the present invention.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

The term, "real-time", for example "displaying real-time data," refers to the display of the data without intentional delay, given the processing limitations of the system and the time required to accurately measure the data.

The term. "near-real-time", for example "obtaining real-time or near-real-time data" refers to the obtaining of data either without intentional delay ("real-time") or as close to real-time as practically possible (i.e. with a small, but minimal, amount of delay whether intentional or not within the constraints and processing limitations of the of the system for obtaining and recording or transmitting the data.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

DESCRIPTION OF EMBODIMENTS

It should be noted in the following description that like or the same reference numerals in different embodiments denote the same or similar features.

A system 110 for geographically referencing an item is depicted in FIG. 1 implemented in a device 112 in accordance with aspects of the present invention.

The present invention will be described with particular reference: to geographically referencing an item, which may be an electronic, digital, or virtual item, in a store 114 comprising an electronic database incorporating information from a geographical coordinate system; to a tool for use in geographically referencing the item, and; to establishing an anchor for computer generated perceptual information (such as, for example, augmented reality).

However, it will be appreciated that the invention is not limited to these particular fields of use, and it may be used in respect of other items, and for additional and/or alternative purposes.

The item may comprise one or more of: data; a file; an email; an image; a social media post; a document; a record of electronic transaction; a link to an external database.

As will be described in further detail, the embodiment of the invention comprises the system 110 implementing in the device 112 a method for geographically referencing an item that the inventor has developed.

The device 112 is carried by a person being the user 116.

As depicted in FIG. 1, the device 112 comprises a plurality of components, subsystems and/or modules operably coupled via appropriate circuitry and connections to enable the device 112 to perform the functions and operations herein described. The device 112 comprises suitable components necessary to receive, store and execute appropriate computer instructions such as a method for geographically referencing an item in accordance with embodiments of the present invention.

Particularly, and as shown in FIG. 1, the device 112 comprises computing means which in this embodiment comprises a controller 118 and storage 120 for storing electronic program instructions for controlling the controller 118, and information and/or data; a display 122 for displaying a user interface 124; and input means 126; all housed within a container or housing 128.

As will be described in further detail, the controller 118 is operable, under control of the electronic program instructions, to make an item searchable by geographical reference information (GRI), thereby creating a georeferenced item.

In an embodiment, to make the item searchable by GRI, the controller 118 is operable, under control of the electronic program instructions, to: add the item to the store 114 and insert the GRI for the item into a field within the store 114.

In an embodiment, the store may comprise object storage for unstructured data, and may be in the form of Binary Large Object (Blob) storage. In such an implementation, the controller 118 may be operable, under control of the electronic program instructions, to: save the item in the Blob storage and then insert the GRI into a field within a database of the Blob storage. Particularly, the controller 118 may be operable, under control of the electronic program instructions, to: save all items in the Blob Storage and then insert the GRI into a field within that database (i.e. not within the native file itself).

In an embodiment, and as will be described in further detail, the controller 118 is operable, under control of the electronic program instructions, to: detect the item.

Furthermore, in an embodiment, the controller 118 is operable, under control of the electronic program instructions, to: determine whether the item can or cannot hold geographical reference information (GRI); and if it is determined that the item can hold GRI, add GRI to the item to create a georeferenced item. In embodiments, such action may be performed in a back end (i.e. a backend database) of the system 110 rather than a front end.

In the embodiment, in the case that it is determined that the item cannot hold GRI, the controller 118 is operable, under control of the electronic program instructions, to form an association between the item and a second item that can hold GRI, and then add GRI to the second item to create the georeferenced item.

Furthermore, in the embodiment, the controller 118 is operable, under control of the electronic program instructions, to add the georeferenced item to the store 114, wherein the georeferenced item is searchable in the store 114 via the added GRI.

This may be implemented by, for example, an added field by Blob storage that can hold the GRI, or storing the GRI within metadata for a particular file of the item.

Additionally, in the embodiment, the controller 118 is operable, under control of the electronic program instructions, to generate and display via the display 122 the user interface 124, the user interface 124 being operable to allow the user 116 to control the input means 126 to input user instructions via the input means 126. The user instructions may comprise a command to perform an action, activity, or function, in which case the controller 118 is operable, under control of the electronic program instructions, to cause the device 112 to perform the action, activity, or function, according to the received user instructions.

Particularly, in the embodiment, the controller 118 is operable to control and run applications for geographically referencing an item.

In embodiments of the invention, the input may comprise data and/or information, which may be obtained by one or more of capturing, retrieving, receiving, extracting, and identifying it, from one or more sources. The one or more sources of data may reside on the storage 120, and/or elsewhere, remote from the device 112.

The controller 118 comprises processing means in the form of at least processor, processing device, or hardware processor.

The storage 120 comprises memories, in the form of read only memory (ROM) and random access memory (RAM).

The device 112 is capable of receiving instructions that may be held in the ROM or RAM and may be executed by the at least one processor. The at least one processor is operable to perform actions under control of electronic program instructions, as will be described in further detail below, including processing/executing instructions and managing the flow of data and information through the device 112.

In the embodiment, electronic program instructions for the device 12 are provided via a single standalone software application (app) or module, and/or as a software development kit (SDK) to be included or executed from within other apps, and/or a service running on servers and/or the cloud(s). In the embodiment described, the app, and/or SDK and/or service is marketed under the trade mark FOUNDAT™, and can be downloaded from a website (or other suitable electronic device platform) or otherwise saved to or stored on storage 120 of the device 112 and/or executed via an Application Program Interface (API). As a whole, the system 110 of the embodiment may be referred to as the FOUNDAT™ system or platform, and the app as the FOUNDAT™ app.

In preferred embodiments of the invention, the device 112 is a mobile communication device and comprises a smartphone such as that marketed under the trade mark IPHONE® by Apple Inc, or by other provider such as Nokia Corporation, or Samsung Group, having Android, WEBOS, Windows, or other Phone app platform. Alternatively, the device 112 may comprise other computing means such as a personal, notebook or tablet computer such as that marketed under the trade mark IPAD® or IPOD TOUCH® by Apple Inc, or by other provider such as Hewlett-Packard Company, or Dell, Inc, for example, or other suitable device.

In the embodiment, the FOUNDAT™ app is a mobile-first application targeting iOS and Android platforms. It aims and is operable to capture accurate geo-location data from users when they perform various activities on their phone (i.e. device 112). These activities include taking photos, interacting with social media, and sending emails, for example.

On the flip-side of the data capture mechanism, the FOUNDAT™ app provides user's the ability to search and filter their assets based on location.

The device 112 also includes an operating system which is capable of issuing commands and is arranged to interact with the app to cause the device 112 to carry out actions including the respective steps, functions and/or procedures in accordance with the embodiment(s) of the invention described herein. The operating system may be appropriate for the device 112. For example, in the case where the device 112 comprises an IPHONE® smartphone, the operating system may be iOS.

As depicted in FIG. 1, the device 112 is operable to communicate via one or more communications link(s) 130, which may variously connect to one or more remote devices 132 such as servers, personal computers, terminals, wireless or handheld computing devices, landline communication devices, or mobile communication devices such as a mobile (cell) telephone. At least one of a plurality of communications link(s) 130 may be connected to an external computing network through a telecommunications network.

In the embodiment described, the remote devices 132 include other devices 112, owned and/or operated by other persons.

The app, and other electronic instructions or programs for the computing components of the device 112, can be written in any suitable language, as are well known to persons skilled in the art. In embodiments of the invention, the electronic program instructions may be provided as stand-alone application(s), as a set or plurality of applications, via a network, or added as middleware, depending on the requirements of the implementation or embodiment.

In alternative embodiments of the invention, the software may comprise one or more modules, and may be implemented in hardware. In such a case, for example, the modules may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

The computing means can be a system of any suitable type, including: a programmable logic controller (PLC); digital signal processor (DSP); microcontroller; personal, notebook or tablet computer, or dedicated servers or networked servers.

The at least processor, processing device, or hardware processor comprising the processing means can be any custom made or commercially available processor, a central processing unit (CPU), a data signal processor (DSP) or an auxiliary processor among several processors associated with the computing means. In embodiments of the invention, the processing means may be a semiconductor based microprocessor (in the form of a microchip) or a macroprocessor, for example.

In embodiments of the invention, the storage can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The storage may incorporate electronic, magnetic, optical and/or other types of storage media. Furthermore, the respective storage can have a distributed architecture, where various components are situated remote from one another, but can be accessed by the processing means. For example, the ROM may store various instructions, programs, software, or applications to be executed by the processing means to control the operation of the device 112 and the RAM may temporarily store variables or results of the operations.

The use and operation of computers using software applications is well-known to persons skilled in the art and need not be described in any further detail herein except as is relevant to the present invention.

Furthermore, any suitable communication protocol can be used to facilitate connection and communication between any subsystems or components of the device 112, and other devices or systems, including wired and wireless, as are well known to persons skilled in the art and need not be described in any further detail herein except as is relevant to the present invention.

Where the words "store", "hold" and "save" or similar words are used in the context of the present invention, they are to be understood as including reference to the retaining or holding of data or information both permanently and/or temporarily in the storage means, device or medium for later retrieval, and momentarily or instantaneously, for example as part of a processing operation being performed.

Additionally, where the terms "system", "device", and "machine" are used in the context of the present invention, they are to be understood as including reference to any group of functionally related or interacting, interrelated, interdependent or associated components or elements that may be located in proximity to, separate from, integrated with, or discrete from, each other.

Furthermore, in embodiments of the invention, the word "determining" is understood to include receiving or accessing the relevant data or information.

In the embodiment of the invention, the display 122 for displaying the user interface 124 and the user input means 126 are integrated in a touchscreen 134. In alternative embodiments these components may be provided as discrete elements or items.

The touchscreen 134 is operable to sense or detect the presence and location of a touch within a display area of the device 112. Sensed "touchings" of the touchscreen 134 are inputted to the device 112 as commands or instructions and communicated to the controller 118. It should be appreciated that the user input means 126 is not limited to comprising a touchscreen, and in alternative embodiments of the invention any appropriate device, system or machine for receiving input, commands or instructions and providing for controlled interaction may be used, including, for example, a keypad or keyboard, a pointing device, or composite device, and systems comprising voice activation.

Input may also be received via at least one sensor which is part of a sensor system or a set of sensors 136 of the device 112. Individual sensors within the set of sensors 136 are operable to monitor, sense and capture or otherwise gather or measure sensor data and/or information associated with or relating to one or more characteristics, properties and parameters of the device 112, the surrounding environment, or components, systems or devices associated therewith or coupled thereto. For example, the set of sensors 136 is operable to sense and gather sensor data relating to a state of the device 112 and/or a state of the environment surrounding the device 112. In an embodiment, the state of the device 112 comprises a position or geographical location of the device 112. In an embodiment, the state of the device 112 further comprises a velocity and/or speed of the device 112. The set of sensors 136 include an inertial sensor system comprising an acceleration sensor and an orientation sensor, a direction sensor and a position sensor.

Alternative embodiments of the invention may comprise additional and/or alternative sensors, including a motion sensor, an infra-red sensor, a depth sensor, a three dimensional imaging sensor, an inertial sensor, a light source sensor, and a Micro-Electromechanical (MEMS) sensor.

The acceleration sensor is operable to measure an acceleration of the device 112 and produce an acceleration data. For example, the acceleration sensor may be an accelerometer. The orientation sensor is operable to measure a rate of change of the orientation (i.e., angular rate) of the device 112 and produce an orientation data. For example, the orientation sensor may be a gyroscope. The direction sensor is operable to determine a direction relative to the Earth's magnetic poles and produce a direction data. For example, the direction sensor may be an electronic compass. The position sensor is operable to determine a position of the device 112 and produce a position data. For example, the position sensor may be a Global Positioning System (GPS). The use and operation of such sensors is well-known to persons skilled in the art and need not be described in any further detail herein except as is relevant to the present invention.

The set of sensors 136 includes imaging means in the form of a digital camera operable to capture images or imagery comprising visual representations. The camera is integrated with the device 112 in the embodiment. The imaging means may comprise any suitable system or device facilitating the acquisition of still and/or moving images. For example, in the case where the device 112 comprises an IPHONE® smartphone, the imaging means may be an iSight™ camera. The use and operation of cameras is well-known to persons skilled in the art and need not be described in any further detail herein except as is relevant to the present invention.

The device 112 comprises operably connected/coupled components facilitating performance and operations as described, including appropriate computer chips (integrated circuits), transceiver/receiver antennas, and software for the sensory technology being used.

One or more sensors of the set of sensors 136 may be integrated with the device 112, as may be the case where it comprises an IPHONE® smartphone. Alternatively, the device 112 may be operably coupled to one or more of the above-described set of sensors 136.

A device database 138 or databank also resides on the storage 120 and is accessible by the controller 118 under control of the app. The controller 118 is arranged to interact with the device database 138 as appropriate to cause the device 112 to carry out actions including the respective steps, functions and/or procedures in accordance with the embodiment of the invention described herein.

Details stored or saved remotely, for example in one or more remote database modules residing on respective storage of one or more remote systems or devices 132, are accessible by the device 112 via the one or more communications link(s) 130. The controller 118 is arranged to facilitate user interaction with the one or more remote databases to make the remotely stored content available for use as required.

It will be understood that any of the database(s) described may reside on any suitable storage device, which may comprise memory encompassing solid state drives, hard disc drives, optical drives or magnetic tape drives, for example. The database(s) described may reside on a single physical storage device or may be spread across multiple storage devices or modules.

The device database 138 is coupled to the controller 118 and in data communication therewith in order to enable information and data to be read to and from the device database 138 as is well known to persons skilled in the art. Any suitable database structure can be used, and there may be one or more than one database. In embodiments of the invention, the device database 138 can be provided locally as a component of the device 112 (such as in the storage 120) or remotely such as on a remote server, as can the electronic program instructions, and any other data or information to be gathered and/or presented.

In alternative embodiments of the invention, there may be more or less databases.

The following table summarises example technologies and frameworks that may be used to implement the described embodiment(s) of the invention:

| Platforms/Framework | Purpose |
| --- | --- |
| Azure Blob Storage | Storage |
| Azure SQL Database | Storage |
| App Service | API Layer |
| Azure B2C | Authentication and Authorisation |
| React Native | Mobile application development framework |
| ViroReact | Augmented Reality Mobile Framework |
| Navisens | Location Detection Framework |
| Google Maps | 2D Maps |

As to architecture, in the embodiment, the FOUNDAT™ app is built using the ReactNative mobile application framework. ReactNative is a hybrid mobile framework, meaning that a single code base can be compiled to run natively on iOS and Android platforms.

In the embodiment, the FOUNDAT™ app uses Microsoft's Azure for cloud hosting, which supports the ability to scale horizontally and vertically to facilitate growth demands. The application of the embodiment uses a loosely coupled n-layer architecture, which advantageously means that layers can be more easily interchanged, or integrated with other technologies and platforms, to promote flexibility and ease of maintenance. At the core of the application is the service layer, which, in the embodiment, is built using a platform agnostic REST API. The REST API allows application data to be securely consumed from a number of platforms, including mobile, web, or desktop.

Particular components of the system 110 will now be described in further detail.

Once the app is installed on the device 112, or the SDK or the service where the invention software is stored and running are called, the controller 118 is operable, under control of the app, to present, via the touchscreen 134, a sequence of navigable electronic pages, screens and forms to the user 116 of the device 112 allowing for the inputting or capture of input comprising data and/or information, including data and/or information sensed via sensors of the set of sensors 136 such as images and imagery captured via the camera, instructions and commands pertinent to operation of the device 112 and the system 110.

Functionality provided to the user via the sequence of sequence of navigable electronic pages, screens and forms including those for: User Registration and Authentication; Image Capture and Upload; Location Detection; QR-code Reader; Display And Render of 3D image objects based on original location of image acquisition; and High-level Display of markers on Google maps, indicating original location of image acquisition (including zoom functionality).

Geographically Referenced Database and Search Engine

Describing an embodiment of one form of the invention in further detail, the database of the store 114 may exist and be implemented as a cloud-based database (provided on respective storage of the one or more remote systems or devices 132) for the storage of the user's 116 personal and business data and/or information. In the embodiment, the user 116 has the FOUNDAT™ app operably installed on and across their hand-held devices, of which device 112 is one example, such as mobile phones and tablets, as well as on their personal computer. The application (FOUNDAT™ app) is operable to work in the background whilst they are using their hand-held devices for all of their usual tasks and activities, including those involving the creation and/or generation or manipulation of items, such as, for example and including, sending emails, taking photographs, posting on social media, taking notes and purchasing goods and services online, as well as in person. Some of these tasks and activities involve the storage of data and/or information for items arising therefrom locally on the user's hand-held devices (in the device database 138 and/or otherwise in the storage 120 as appropriate), such as taking photographs and sending emails, etc., whereas some other tasks and activities may only involve a small degree of data storage of items arising therefrom locally, they predominantly rely upon data storage externally (on respective storage of the one or more remote systems or devices 132). An example of this may be posting on social media, whereby the main data storage of the item comprising the social media post occurs on the relevant cloud database for that social media service. Regardless of whether the predominant amount of data is stored locally on the users device 112, or remotely, the embodiment of the current invention is operable to detect an item, determine whether the detected item can or cannot hold GRI, and if it is determined that the detected item can hold GRI, add GRI to the item to create a georeferenced item. If it is determined that the detected item cannot hold GRI, the embodiment of the current invention is operable to form an association between the item and a second item that can hold GRI, and then add GRI to the second item to create the georeferenced item. It is then operable to add the georeferenced item to the store 114, wherein the georeferenced item is searchable in the store 114 via the added GRI via a search feature or operation of a search engine of the application (FOUNDAT™ app).

This is implemented in the embodiment by the system 110 being operable to either directly modify the attributes of the file type of the item generated, to include GRI for the file, or alternatively, if the native file type does not support the inclusion of geographical information, to create an associated file type that can be linked to the original file that is being generated. In one form or embodiment of the invention, the associated file type may be an image file that supports attributed geographical coordinates or GRI. This image file may be in many different forms, however in one form or embodiment of the invention, it may be either an image of an icon or symbol relating to a particular application used for the task or activity that generated the original file type of the item, to which the image is being associated. Additionally, or alternatively, the image file used for association may be in the form of a screen shot taken from the output of the particular application used for the task or activity, that generated the original file of the item. It is also possible that multiple forms of reference file could be generated, all in reference to the same original file.

There are many alternatives available for the process in which an association is created between the original file and the associated file. In one form or embodiment of the invention, this association may be in the form of a hyperlink that points to a unique identifier (such as, for example a number/code) for the original file type, or it could point to the original filename in a central directory of all files. In order to enable the data to co-exist in both the geographical representation and the traditional electronic filing structure, one possible method that may be utilized, is to maintain a central or master directory that physically stores all data according to unique identifying codes, which cannot be changed. All subsequent representations of the files, for example geographical representations or traditional electronic filing structures etc., may be produced using hyperlinks that refer back to the central or master directory. This advantageously may ensure that the hyperlink is not broken when or if the electronic filing structures are changed, which has tremendous benefits for the user 116 in that, even if they happen to accidentally delete a hyperlink representation of a file in a traditional electronic filing structure, they will still be able to retrace their steps geographically to locate the file when it was originally generated or acquired by searching the store 114 via the added GRI using the search feature or operation.

In an embodiment, the system 108 may be operable to refer to a reference table that lists all common file types and identify which ones can and cannot hold GRI within their Meta Data.

To further illustrate and describe some of the options available for the association of different original file types for items that are commonly created or generated on a user's mobile phone, specific examples will now be provided, based upon some common tasks and activities that are carried out on a mobile phone.

The first example is the sending of an item comprising an email. If the user 116 creates and sends a work email from their mobile phone, the email is sent using their normal email platform. As hereinbefore described, in the embodiment of the present invention the application (FOUNDAT™ app) is installed on the user's phone (device 112) and running in the background. Upon sending the email, the system 110 is operable to also create an image file of the icon relating to the user's email platform, that has assigned geographical coordinates that are obtained from the GPS receiver within the user's mobile phone (device 112), at the time of sending the email. The system 110 is further operable to assign the image of this icon a hyperlink to the web address for the sent email item, on the user's webmail interface. This association is generated automatically at the time at which the original file is generated. In embodiments, functionality may be provided by the system 110 so that the user may also have some rules assigned to files of this type that assign other associations. For instance, given that the email is being sent from their work email, it may also provide a user generated association that links the file back to a head office location for their employer. They may also have a rule running within the system 110 that generates another association based upon the recipient email address. For example, if the email is being sent to the email address of one of the users' 116 clients, another association may be generated, whereby the original email file is associated to the geographical location of the client's office. Therefore, in the future, should the user 116 wish to find this particular email that was sent from their work email address, to their client, they could use the search feature of the application (FOUNDAT™ app) installed on their mobile phone (device 112), using any normal search terms such as keywords, and refine by date sent, recipient etc., or alternatively, they could use the visual geographical representation to find the file, by either navigating to the geographical location where the user 116 was when they sent the email, the geographical location of their employers office, or the geographical location of the clients office. At these locations, they system 110 is operable so that they will see, via the user interface 124 on the display 122 of the device 112, the icon that was generated at the time of sending the email. In one form or embodiment of the present invention, the system 110 is operable so that, if the user were to click on the icon (via the user interface 124), it will take them to, and display via the user interface 124 on the display 122 of the device 112, the original email in the sent items of their email provider's webmail service.

In one form or embodiment of the invention, the system 110 is operable to allow users to be able to capture photograph(s) on their hand-held device (device 112), or tablet etc., with the internal GPS of the set of sensors 136 of the device 112 automatically assigning the longitude, latitude and elevation at which the photograph(s) was taken. In such an embodiment, whilst the original photograph is stored locally in storage 120 on the device 112 that took the photograph, a copy of the photograph will also be uploaded to the central database of the store 114. The system 110 is operable to then provide the user 116 with access to this photograph from all of their devices that are connected to the central database of the store 114. The system 110 is operable to provide the user 116 with access to view all of their photographs within a standard filing structure, that may be by month, day etc., for example. The system 110 is also operable to allow the user 116 to switch to a visual geographical representation view screen, via the user interface 124 on the display 122 of the device 112, to see the location that their photographs were taken.

In one form or embodiment of the invention, this geographical representation may be in the form of a three dimensional (3D) graphical representation in the form of a globe of the Earth, with functionally provided by the FOUNDAT™ app that enables the user 116 to navigate and zoom in/out etc., via the user interface 124, to find the location that they are looking for. Once the geographical location that the user 116 is looking for has been found, they may see at least one indication in the form of indicator(s) or marker(s) 140 generated and displayed by the system 110 via the user interface 124 on the visual geographical representation view screen, which indicate the presence of files matching their search query, which in this instance is for photographs. In one form or embodiment of the invention, the user 116 may be able to expand the view at this particular location, so that they can view thumbnails or similar for each image, so that they can easily scroll through the images to find the one that they are looking for. Once the user 116 has found the image that they are looking for, the system 110 is operable to enable the user 116 to perform at least one, and in the embodiment a range of functions with the file, such as view it on their local device 111, share it with at least one, or any range of other users, or even attach it or cross reference it to a file of another type. In one form or embodiment of the invention, should the user 116 choose to associate that image with another file, for instance possibly a written document, then this newly associated written document may also adopt the geographical coordinates of the image file that is referenced to it, by operation of the system 110. Again, that same written document could have any number of geographical points, including single, 2D, or 3D, GRI attached to it.

In one form or embodiment of the invention, any files created or modified within the database of the store 114, may be subject to a wide range of other processes. For instance, with reference to photographs or images that are stored in the database of the store 114, they may also be subject to textual recognition processes, such that any text that appears within the photographs images, will be catalogued and will be searchable from within the internal search engine of the system 110.

From the above, it can be seen that one way of describing the (FoundAt™) database of the store 114 is to liken it to a "Digital Twin" of the Earth in that it is a large scale cloud database that applies 3D geographical coordinates to all items of data stored within it.

This facilitates the association of data files with any overlaid information, including, for example, information such as aerial imagery, map information and other 3D models etc. As described, the database of the store 114 has a front end (provided via the user interface 124) that can then visually display its information in either a 3D view of the Earth, or a more traditional electronic filing format, etc., in the embodiment.

In the embodiment, the automatic allocation of geo tags or coordinates to all data files in the database of the store 114 is utilised as a means of ensuring that the data is available in a known location, so that it can easily be utilised at a later date, without, or at least mitigating or reducing, the risk of losing that data or being unable to find it. This then makes it possible to advantageously consolidate the data captured from a large base of users and ensure consistent integrity that is not reliant upon individuals all adhering to strict naming, numbering or filing conventions etc., for example, which has traditionally resulted in significant problems, especially in corporate and government environments. Furthermore, this approach to data management advantageously does not require any upfront investment in sophisticated models or systems, as well as ongoing investment for the administration and maintenance, such as can be experienced with Digital Twin or Building Information Modelling (BIM) etc.

In embodiments of the invention, there are provided three main platforms for users to interface with the FoundAt™ database of the store 114, being as an application (the FoundAt™ app) installed on personal devices such as mobile phones and tablets etc., or desktop applications for use on personal computers or laptops etc. There is also an enterprise version that can be installed on corporate or government servers, that may come with much more powerful functionality than that offered to individual users. In embodiments, it is also possible for corporate entities to utilise the functionality and benefits of the FoundAt™ platform for their secure corporate data on a stand alone server that is not connected to the public FoundAt™ server system, so as to give corporate entities the assurance that they are looking for in terms of data security.

Now will be outlined in further detail relative features and benefits for individual/personal users, such as the user 116, in the FoundAt™ environment. As a general overview, the FoundAt™ app of embodiments may be available for download on mobile devices that are using either IOS or Android operating systems and operable to seamlessly integrate with the native operations of that device, to ensure that all of the user's 116 data is securely stored in the FoundAt™ database of the store 114. The FoundAt™ app achieves this by running in the background on the user's 116 device 112 and then accessing any services or data that the user 116 has authorised the FoundAt™ app to, and then applying highly accurate 3D geotags to each data point and uploading the file to the FoundAt™ cloud based storage in the database of the store 114.

One of the keys to the advanced features offered by the system 110 of the embodiment of the invention is due to the much greater levels of accuracy that the FoundAt™ app can achieve in terms of 3D location, and as will be described in further detail. Where a standard GPS location from a mobile device may be at best accurate to approximately 5 m in ideal locations, it is often found that the accuracy is more like 15-20 m in urban environments where GPS signals are reflected off structures such as buildings and the like. This accuracy is even lower once a user moves inside a building, as personal mobile devices etc., often then rely upon triangulation from the mobile network, in order to obtain some form of location, however this can be highly inaccurate and variable.

In contrast to this, the FoundAt™ app in the embodiment seeks to provide consistent location information that is accurate within 1-2 m, whether the user is indoors or outdoors. In addition to this, the FoundAt™ app is also operable to store accurate directional data (obtained by sensors of set of sensors 136) with items, such as photographs etc., that are taken (or otherwise created or generated) using the users 116 personal device 112. This then not only provides the accurate location at which the user 116 was standing when they took the photo, for example, but also which direction they were (or at least the device 112) was facing when they took the photograph. As a comparison, the current accuracy of geo tags on photographs taken within an indoor environment is often as little as within a radius of 40-50 m and there is no information to show which way they were looking when the photograph was taken. This often means that showing the image on a map is not even accurate to the actual address that the image was taken. Whereas, with the FoundAt™ app of the embodiment running on their personal device 112, the user 116 is not only able to ensure that their photograph accurately identifies the address at which it was taken, but also the actual room, floor number and wall that they were looking at when they took the photograph. With this level of accuracy comes a whole new world of possibilities and applications.

As will be described in further detail, in the embodiment accurate location determination is achieved firstly through a calibration process that is aimed at correcting the natural error associated with GPS location, then secondly by monitoring the output from the accelerometer and gyroscope (of the set of sensors 136) from that known calibration location, so as to approximate the new location. Calibration can be via several means, such as visual calibration against aerial imagery. For example, if the user 116 were standing on a street corner, they can drag their location pointer to be exactly on that street corner (via the user interface 124). Alternatively, and/or additionally, calibration could be via scanning a QR code, etc. (with embedded coordinate information), for example, as will be described hereinafter in further detail.

When the FoundAt™ app has been installed on a user's 116 personal device 112, they are able to continue to carry out all normal tasks that they would on their device 112. Whilst doing so, the FoundAt™ app is operable to run in the background and save all of their data to the FoundAt™ cloud storage of the store 114. At the same time, the FoundAt™ app is operable to capture accurate location information and attribute this to each piece of data. Whenever the user 116 needs to find such data that has been so stored, they can search based upon any normal file type, name and date range type queries. In addition to these standard search type queries, the FoundAt™ app also makes it possible for the user to retrace their steps in the digital world by switching to the 3D view of the world and going back to the geographical location associated with the file, so that they can further narrow down their search query, to only files that were generated within that particular geographical area, via the user interface 124. In this regard, FIG. 2 of the drawings depicts an example of a typical view of a 3D city location view screen 142 of the user interface 124 generated and displayed via the display 122 of the device 112, showing (by markers 140) files matching a search query that has been inputted.

One of the most common uses for personal mobile devices is to use social media for both scrolling through the users feed and also for the sharing of files. The FoundAt™ app of the embodiment is operable to enhance the user's 116 experience whilst using their preferred social media platform in conjunction with the FoundAt™ app, or alternatively, in embodiments, the FoundAt™ app also has its own platform for the sharing of media with others including those categorised as Family, Friends, Followers, Colleagues or just the general public.

Whilst the user 116 continues to post on social media, the FoundAt™ app runs in the background and applies accurate geo tags (as hereinbefore described) to all posts (and other items) that the user 116 makes. As with other forms of data, the user 116 is able to go into the 3D globe view within the FoundAt™ app (via the user interface 124) and search to find their previous posts etc., based upon the geographical location attributed to each. The user is able to select (via the user interface 124) which location is shared with their chosen contacts. It could be the geographical location from which the post was sent, or only the location from which the embedded information (photograph for example) was generated. In embodiments, there are significant security controls built into the FoundAt™ app, such as the ability for the user 116 to mask certain locations of personal significance, such as their home or work address etc., for example. In embodiments, there is also provided settings available to selectively tailor the security controls based upon the audience with which information is being shared. For instance, any information shared with Family may allow all accurate location information to be shared, including masked locations. Whereas, any information that was shared with Followers, may default to the nearest city centre, etc., so that there is some information available as to the city from which it was generated, but nothing more specific that could possibly expose any unwanted personal information.

One of the important benefits that embodiments of the invention seek to bring to social media is a level of integrity and visibility in the data shared, that assists in reducing some of the current shortcomings of social media platforms. If we look at this in practice, we can consider a situation where a FoundAt™ user 116 may be interested in following a particular sporting event etc., at a venue, for example. In this instance, the user 116 is able to go to the 3D global view within the FoundAt™ app (via the user interface 124) and search for all current social media posts originating from that venue. The system 110 does not require the use of particular hashtag's etc., to link posts to an event, it can be driven purely by geographical location and timeframe. This not only gives the FoundAt™ user 116 easy access to any information that they are seeking but it also adds much greater integrity to the information that they are viewing in that they can be sure that they are only looking at posts from people actually at the sporting event, as opposed to others that may have opinions on the event but are not actually attending the event.

Another example application of embodiments of the invention that may benefit social media is the ability to add one or more any additional layers of interest, such as the ability to search for any of the user's 116 favourite influencers or personalities etc., and to follow any of their public posts from around the world, so that the user 116 is able to ensure that they don't miss any posts from the person of interest during their travels etc.

In the embodiment, the FoundAt™ app is also operable to provide the user 116 with the ability to use their personal mobile device 116 as a window to the digital world around them, via an integrated Augmented Reality (AR) viewer that allows the user 116 to run a search query within the user interface 124 of the FoundAt™ app and then hold up their mobile device 116 to look around them and see the exact position of any data points (for items in the database of the store 114) that match their query (via the user interface 124). This is made possible on a large scale due to the detailed accuracy of the geographical coordinates attached to each file within the FoundAt™ platform. Where AR applications are common within small localised areas, the embodiment of the system 110 makes it possible for users to explore the entire Earth with the assistance of the AR viewing feature within the FoundAt™ app. With it, this feature brings a vast array of new opportunities, such as the ability to share important local information (including emergency information), as well as new forms of electronic signs and billboards etc., that appear "in the air" in AR (and viewable via the user interface 124) around the users 116 current location. It is also possible for users to be connected to the digital world around them on a more consistent basis than just when they are holding up their personal mobile device to view the digital information around them. As one example, users may utilise "smart glasses" etc., for example, or similar technology, operable to constantly transfer information to them for viewing as they walk through their environment. Alternatively, they could apply a filter to search for only specific information, such as social media posts made by their friends within their current location etc., for example. Again, the location accuracy achieved the embodiment of the invention may play an instrumental part in ensuring a very unique and compelling experience for the user. As another example, it is possible for a user running the FoundAt™ app on their personal mobile device to sit at a particular table in a restaurant and not only see any social media posts from other people who have visited the same restaurant but in fact, they can also see posts from other people whom have sat at the same exact table.

Figure 3:
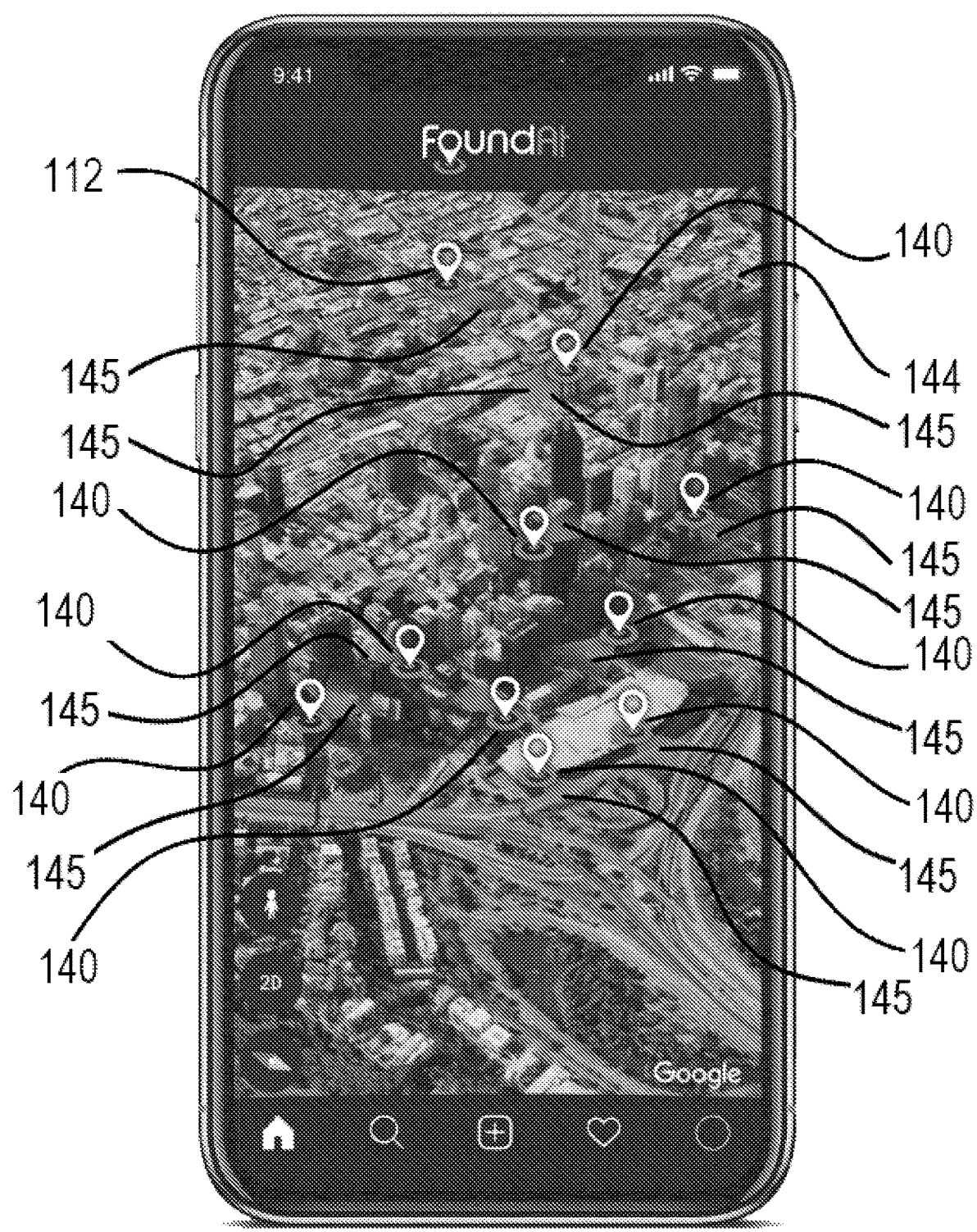
FIG. 3 depicts an example of an image location and facing search results screen of the user interface generated and displayed via the display.

As hereinbefore described, the system 110 of the embodiment is operable to offer much greater location accuracy than previously achievable and, perhaps more importantly, to also provide accurate directional facing information. This may advantageously make it much easier for a user to scan (via the user interface 124) the 3D Global view for any photographs in the store 114 of the subject that they desire, be it from their own photograph library or from that of other users that has been shared with them (or shared publicly). FIG. 3 of the drawings provides an indicative screen shot view 144 showing image location via marker 140 and facing indication 145 that a user 116 may see in a typical city setting, when searching for photographs, via the user interface 124 of the device 112. Other important information that can be obtained by the user 116 by use of the system 110 is accurate height information, as required to determine, for example, the precise floor number from which a photograph was taken within a tall building. Another important tool included with the FoundAt™ image platform in embodiments of the invention is Optical Character Recognition (OCR) or textual recognition technology operable to make it possible to conduct a text based search for any photographs containing text such as signage etc., for example, within them. This also makes it possible for the application of online translations etc.

In this regard, another common activity performed on a mobile phone is to purchase goods either online or in person. Reference will now be made to possible applications for embodiments of the present invention with respect to this activity.

A common use for personal mobile devices is to carry out electronic purchases using the likes of Apple Pay™ or Google Pay™ etc. Again, the embodiment of the present invention is able to offer benefits to users in this area in that the FOUNDAT™ app can be running in the background on a personal device that is used for such purchases and then save any relevant information including vendor name, date, time, amount and purchase details etc., along with the relevant geographical location information. In the future, if the user 116 is in need of finding this transaction information for the purposes of personal expense claims, taxation claims or warranty claims etc., for example, then the user 116 is able to search their personal database (of the store 114) for any desired date range, vendor name or item name etc., to locate the record. Alternatively, as with all other records in the store 114, the user 116 can also open the 3D Global view within FoundAt™ app via the user interface 124 to digitally retrace their steps and go back to the exact location where the purchase was made, in order to locate the record that they seek. Should electronic purchases not be supported at that particular vendor, the user 116 is still able to take a photograph of a paper based or screen based receipt etc., for example, and rely upon the image OCR to save the relevant textual data for the transaction.

In one form or embodiment of the present invention, the application (FOUNDAT™ app) may be running within the background processes on their handheld device 112, while the user 116 completes an online purchase. As with the previous examples, there are any number of ways in which the present invention could be applied to this situation. The FOUNDAT™ app may be operable to communicate directly with the purchasing application/platform involved in processing the purchase to obtain details and/or information of and/or relating to the purchase and directly store the purchase details and/or information in the database of the store 114. Alternatively, or additionally, the FOUNDAT™ app may be operable to create an image file using the icon for the purchasing application, or a screenshot from the purchasing application. The FOUNDAT™ app may then be operable to assign GRI in any number of forms, such as a single point, a 2D or 3D shape to the relevant record. This GRI may be in reference to one or more, or indeed, any number of, aspects related to the transaction, such as the actual location from which the user executed the transaction, the address of the supplier supplying the goods or even the delivery address for the goods, for example. Should the user 116 be looking for, say, the receipt relating to this transaction at a later date, the system 110 is operable to allow them to use all usual text search features within the database of the store 114, such as purchase date, vendor name, value etc., to conduct a search. The system is operable to allow them to also be able to switch to the visual geographic representation to search for the receipt based upon any of the possible GRI referred to above, by searching the store 114 via the added GRI using the search feature or operation of the search engine.

Embodiments of the present invention can also be utilized by the user 116 when purchasing goods or services in person. In one form or embodiment of the invention, the user 116 may be able to make a purchase using Near Field Communication (NFC) capabilities of their hand-held device 112. The system 110 is operable to then access any relevant details and/or information of and/or relating to the transaction made available from the vendor via the NFC communication, such as transaction number, etc., for example, and to generate a file that records the details of the transaction and attaches it to the receipt that relates to the transaction. The receipt itself may be obtained through at least one, and indeed any number of ways, including that it could be transferred via NFC, it could be generated at the vendor end and made available by the vendor to the system 110, through referencing the transaction number, or the receipt information could possibly even be obtained via the camera of the set of sensors 136 within the hand-held device 112 taking a photograph of a vendors screen, or even the receipt printed on paper. In cases where the camera feature is utilized, then textual recognition may be utilized to ensure that any of the specific information contained within the receipt can be searchable at a later date. If the vendor involved in the transaction does not have any systems that can communicate directly with system 110, then the system 110 may utilize any operable features available to it, to provide the data required by the user 116, such as the application of GRI based upon any images created by the user's 116 handheld device 112, in order to geographically link the receipt image to the vendors location. Again, the image of the receipt itself could recognize the text on the receipt, in order to store the details of the transaction electronically.

In one form or embodiment of the invention, there may be some files generated on a user's 116 handheld device 112 or possibly even their desktop or laptop computer that may not have a need for any external files such as photographs to be directly associated with the original file, so as to link any associated GRI. In such circumstances, the system 110 is operable to just use user assigned coordinates, input by the user 116 via the user interface 124, that are not automatically generated in any way. For instance, if user 116 were to create a written report that does not need any photographs inserted, that have GRI associated with them, then the user 116 could either manually enter coordinates for a point, 2D or 3D shape, as GRI for the written report, or they could do so from within the visual geographical representation by selecting a point or drawing a 2D or 3D shape, entering any relevant input and commands via the user interface 124 of the system 110.

In one form or embodiment of the invention, the application (FOUNDAT™ app) that is installed on a user's 116 mobile phone (device 112) or personal computer, as part of the search engine, is operable to provide the user 116 with a search interface via the user interface 124 that may include multiple views such as a traditional filing structure type view, possibly with one or more search fields that enable searches to be conducted based upon a variety of text fields, such as date of creation and or modification, username that created, application that created/file type and any searchable tags or text within the file. The user 116 is able to conduct a search for any records based upon any one or a combination of these fields via the user interface 124.

As described previously, another view available to the user 116 within the search interface is a geographical representation that shows the physical location that the file was generated. Additionally, or alternatively, the same interface may be utilized for the purposes of presenting GRI for a specific file, which is effectively the total area that the file has been attributed to. This same geographical representation within the search interface can not only be used to help present the results of a search but it can also be utilized for the purposes of generating a search. In one form or embodiment of the present invention, the system is operable to allow the user 116 to be able to create Geographical Search Parameters (GSP) within the geographical representation, so as to constrain the search to a particular geographical area. In relation to the geographical component of the search, a successful search result is obtained when there is an intersection between GRI associated with data records and the GSP that is used to conduct a search. The system 110 is operable to allow the user 116 to be able to switch between the text search view and the geographical representation view, as well as any other available views, as required in order to successfully locate the record that they are looking for in the store 114. For instance, a user 116 may commence a search, via the user interface 124, within the textual view and find that a very large number of results match their query. The user 116 could then, again via the user interface 124, switch to the view providing the geographical representation in order to create some GSP that constrain the search results to the area of specific interest for the user 116. In one form or embodiment of the invention, the system 110 is operable to allow the user 116 to see, via the user interface 124, all geo tags for all search results within the geographical representation, so that this information can be considered by the user 116 when creating the GSP, so as to either restrict or expand the search area. Once the GSP has been created within the geographical representation view, the user can switch back to the text view, so as to review the modified search results after the application of the GSP. In one form or embodiment of the invention, the system 110 is operable to allow the user 116 to scroll through thumbnail results for the search results within the geographical representation via, that assist with locating the desired record, via the user interface 124.

In one form or embodiment of the present invention, the system 110 is operable to allow the user 116, via the user interface 124, to navigate the geographical representation, that includes aerial imagery and also some 3D models or digital twins for assets in which they wish to search for data. Again, the system 110 is operable to allow the user 116 to be able to produce GSP within this view, for the purposes of conducting a data search. Additionally, and/or alternatively, this search could effectively be conducted using the system 110 by a live feed of data whilst the user 116 is physically walking through an environment with their device 112, be it a mobile phone, tablet or personal computer etc., possibly with or without some form of virtual reality or augmented reality headset etc. In such an embodiment, the user 116 may physically move through an environment and utilize their electronic device 112 for the purpose of viewing an augmented reality version of their current environment, that shows the available data in that location, that may match any pre-entered search criteria. This feature may be used in order to enable customers to navigate the interior of any commercial properties when they are connected to, for example, Wi-Fi within that property. By determining the location of the user 116 based upon any available locations systems such as GPS or WPS etc., the system 110 can be used to display any information regarding goods and/or services offered to customers at the user's 116 current location within the commercial property, or possibly even just to provide any navigation assistance (to customers such as the user 116). Furthermore, the system 110 may be operable to offer detailed product information or specifications for a specific product, via the user interface 124, if the user 116 (as a customer, or potential customer) uses the camera of the set of sensors 136 of the device 112 to take a photo of the product or a QR code etc., for example, that is attached to the product.

In embodiments of the invention, benefits available to corporate users of the FoundAt™ platform may be even more pronounced than those available to personal users. In this regard, whilst similar functionality may be made available through the application of geo tags to all forms of data, far greater technical capability may be provided through the desktop and corporate server applications. Examples of such features, implemented in embodiments of the invention, include the possibility of providing a user with the ability to perform at least one action in respect of the geo tag information, including managing, controlling and manipulating the geo tag information. This also includes the ability to assign complex 2D or even 3D shape files to the Geographically Referenced Information (GRI) associated with each file type or even applying such 2D or 3D reference shape files to a search query. In contrast to personal applications, whereby, in embodiments the GRI is a single point in space with X,Y, and Z coordinates, corporate users may be provided with the ability to assign a complex shape file to a piece of data, so as to effectively provide it with a footprint within the digital world. This advantageously ensures that the file is discoverable even if the envelope for the geographical coordinates of a search query only partially intersect with the GRI shape file.

To put into context real world benefits that the described embodiments of the present invention may bring to corporate users, comparison can be made to the complex bespoke Digital Twin and BIM type models that some corporations build for the management of their assets. The FoundAt™ platform of the embodiment offers similar functionality to companies of all sizes and enables them to implement the solution at a much lower upfront time and cost but also reduces the ongoing maintenance and administration costs. Moreover, the FoundAt™ platform provides functionality that is not offered by large scale Digital Twin and BIM type platforms, such as the ability to share information on a large scale with the general public. The benefits of this can be immense, especially in the areas of advertising and the provision of product information etc., and to both large and small corporate entities.

Even if a corporation may already have a Digital Twin platform, or at least have the resources to develop one, embodiments of the present invention can still provide an extremely compelling offering. The FoundAt™ may be implemented within a corporate environment for very little cost upfront and most importantly, it can be utilised immediately for capturing information in the field and saving corporate information with the application of GRI, for access in the field. This advantageously ensures that there is not the lost opportunity that often comes with the implementation of a large scale Digital Twin or BIM platform, due to the often extended development time. It is important to note that this ease of implementation does not mean that a compromise must be made in terms of technical capability, instead a corporate user is able to continue developing their corporate FoundAt™ platform, all while their internal users continue to use it in its current state. The company can ultimately build the same level of functionality as most Digital Twin and BIM platforms, should they desire, by inserting any required level of information, including complex 3D models for all of their assets, including links to all existing corporate software such as financial, inventory, asset management and document management software, into the store 114.

In an embodiment of the invention, traditional electronic filing structure can be allocated with GRI for each folder, so as to automatically file any data generated in the field, into the correct correlating folder.

Another benefit provided by the FoundAt™ platform over Digital Twin and BIM type platforms is the general reach and applicability of the platform makes it easier for all of their users to have the FoundAt™ app installed on their personal mobile devices and laptops etc., and the platform does not need them to specifically upload and correctly name and file their data, it can all happen automatically. This may advantageously lead to the greatest possible value for a corporation's data by ensuring, or at least mitigating or reducing the risk, that data is not lost or misplaced etc. All items such as photos, documents and emails etc. that are automatically geotagged will always be searchable and recoverable within their area of geographic relevance, in embodiments of the invention.

As with the application of the FoundAt™ platform to the management of personal data, the described embodiment of the invention is also suited for use with virtually all forms of corporate electronic data. Some typical examples include items with data types such as customer communication and advertising etc., specific operational processes, fixed asset management, mobile asset management, inventory management, maintenance, construction, transaction records and document management, for example.

Figure 4:
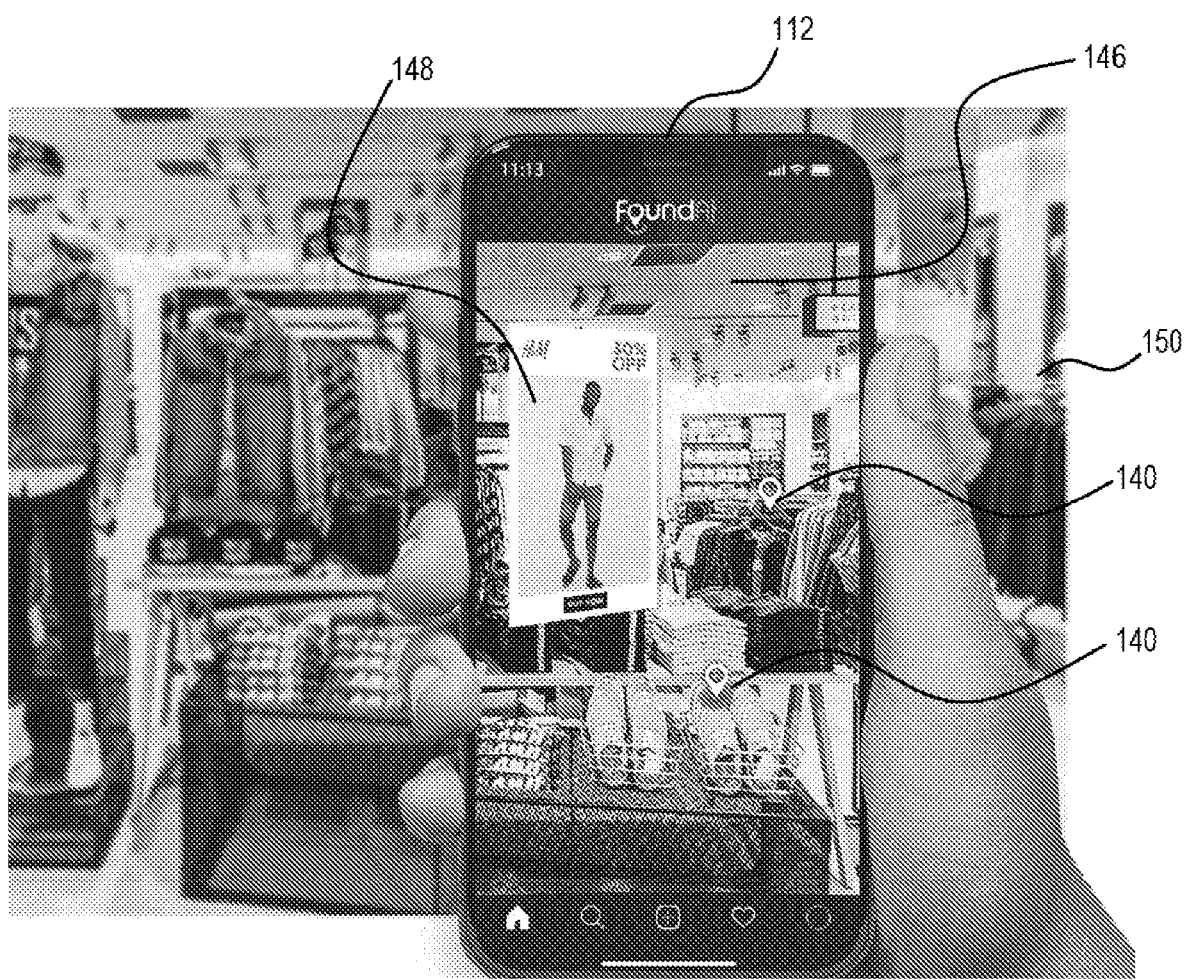
FIG. 4 depicts an example of an AR feature view screen of the user interface generated and displayed via the display used within a retail environment.

Augmented Reality features within the FoundAt™ app enables corporate users to leverage the unique benefits of world scale augmented reality for the sharing of data with all forms of users, such as customers, internal employees, and external service providers etc., all with their relative levels of access permission etc. If we take a typical retail environment as an example, the system 110 is operable to provide Augmented Reality capabilities making it possible for the retailer to convey at least one, and indeed any, of a range of information to customers within their premises, such as product information, specials and navigational type information, all with the ease of the customer using their personal mobile device or smart glasses etc., as hereinbefore described, to look around the retailers physical space. FIG. 4 of the drawings provides an indicative view screen 146 of this feature showing AR product information 148 within a retail environment 150. It is important to note that this feature also promotes a two-way share of information, as the customer is able to use it to generate a product query or the like for the retailer in the embodiment of the invention.

Figure 5:
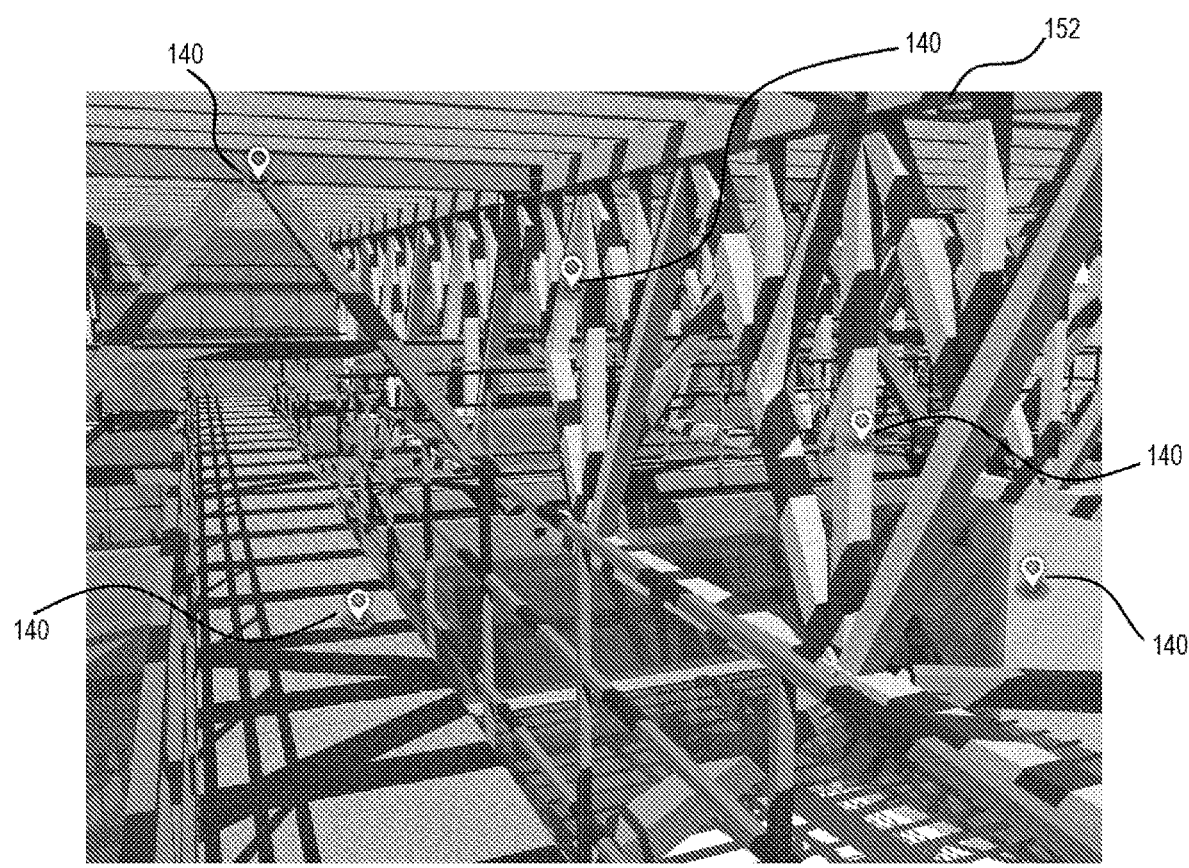
FIG. 5 depicts an example of a process plant with 3D model in an AR view screen of the user interface generated and displayed via the display.

An example of the Augmented Reality feature being applied by employees using the FoundAt™ platform might be within the likes of an industrial environment where a 3D representation of a process plant etc. has been supplied by the company, to facilitate the generation of technical queries etc. by the employee. Again, this can be a two way flow of information between the company and the employee via the FoundAt™ platform. The employee can use the Augmented Reality feature to look around their environment, run a search query for data of a particular type and identify any points that match that query. The employee might search for design or technical information associated with a particular piece of plant or similarly they could take a photograph and raise a maintenance request etc. if they find something that requires repair. The photograph and maintenance request are automatically geotagged by operation of the system 110, so that the exact location of the issue is saved with the request in the store 114 and it can easily be found at a later date, by the maintenance team etc., for example. Importantly, all of this information, including all historic photographs and maintenance requests etc., for example, are available to all users with suitable access rights and permissions, without difficulty in the user trying to identify the correct server storage location, platform or naming convention etc. that is used for the information that they seek. FIG. 5 of the drawings provides an indicative screen view 152 of a process plant with 3D model available in the AR view.

Figure 6:
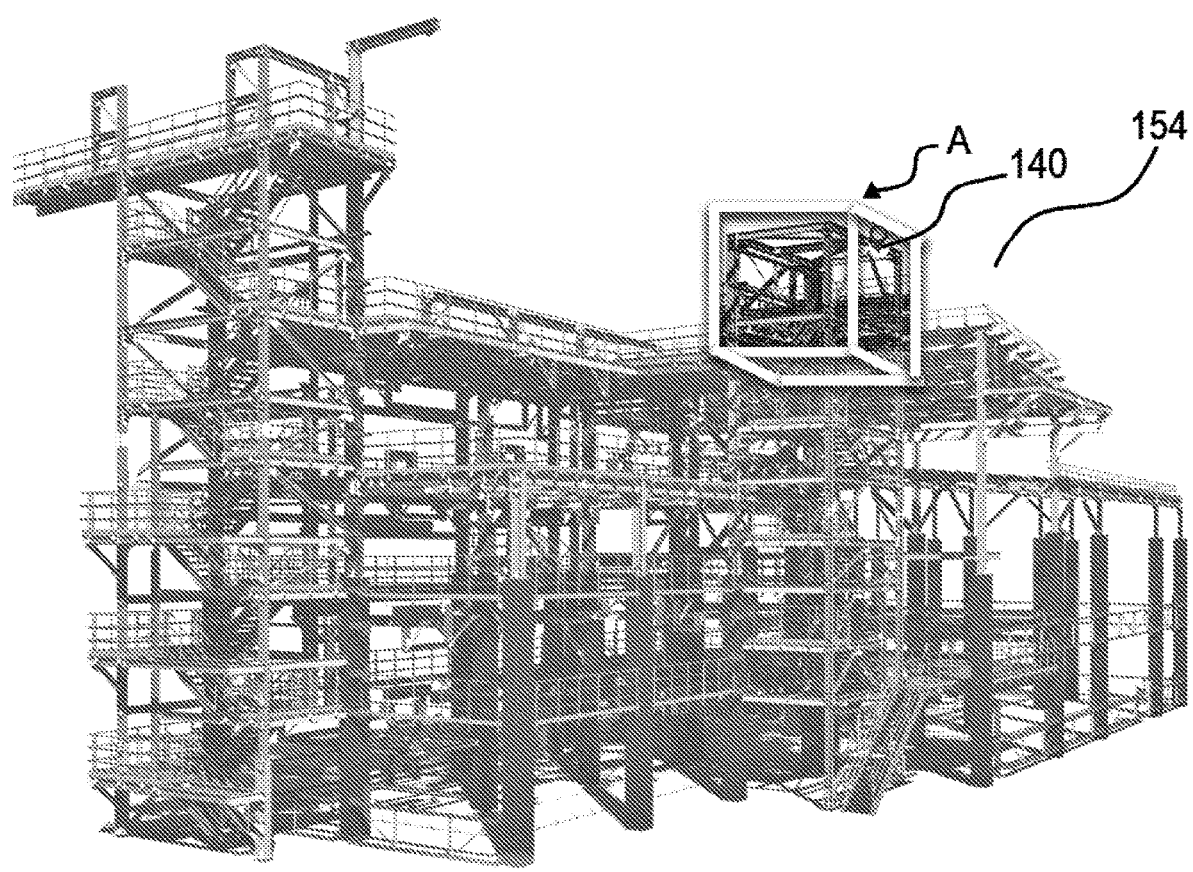
FIG. 6 depicts an example of geographically constrained search results of a search query on a search results view screen of the user interface generated and displayed via the display.

The described embodiment of the FoundAt™ platform makes it possible for corporate users to include much greater functionality, including the ability to apply complex 2D or 3D shape files (GRI) to any electronic file stored in the FoundAt™ database of the store 114. When coupled with the ability, provided by the system 110, to allow users to apply similar 2D or 3D envelopes to any search query, this can provide extremely powerful functionality to the users, which advantageously is not dependent upon strict adherence to naming or numbering conventions, or filing locations etc to ensure that a user finds exactly what they are looking for. FIG. 6 of the drawings demonstrates this within a similar industrial type application. Say for example that a user was looking for any records relating to structural repairs or inspections within the highlighted area A, via the user interface 124, they can draw an envelope or shape, in the form of a box in the example, around the area of interest and include any relevant text etc., within their search query. They will then receive (via the user interface 124) a condensed list of search results that match their query, making it much easier to find exactly what they are looking for. FIG. 6 provides a visual representation 154 of how such a geographically constrained search query may be run. It can be seen through the colour representations, the only areas that feature within the users search results. Again, the FoundAt™ platform also makes it possible to link any information from other corporate systems to the corporation's digital representation of the world, so that the FoundAt™ platform can seamlessly integrate with their existing software and processes, in embodiments.

Figure 7:
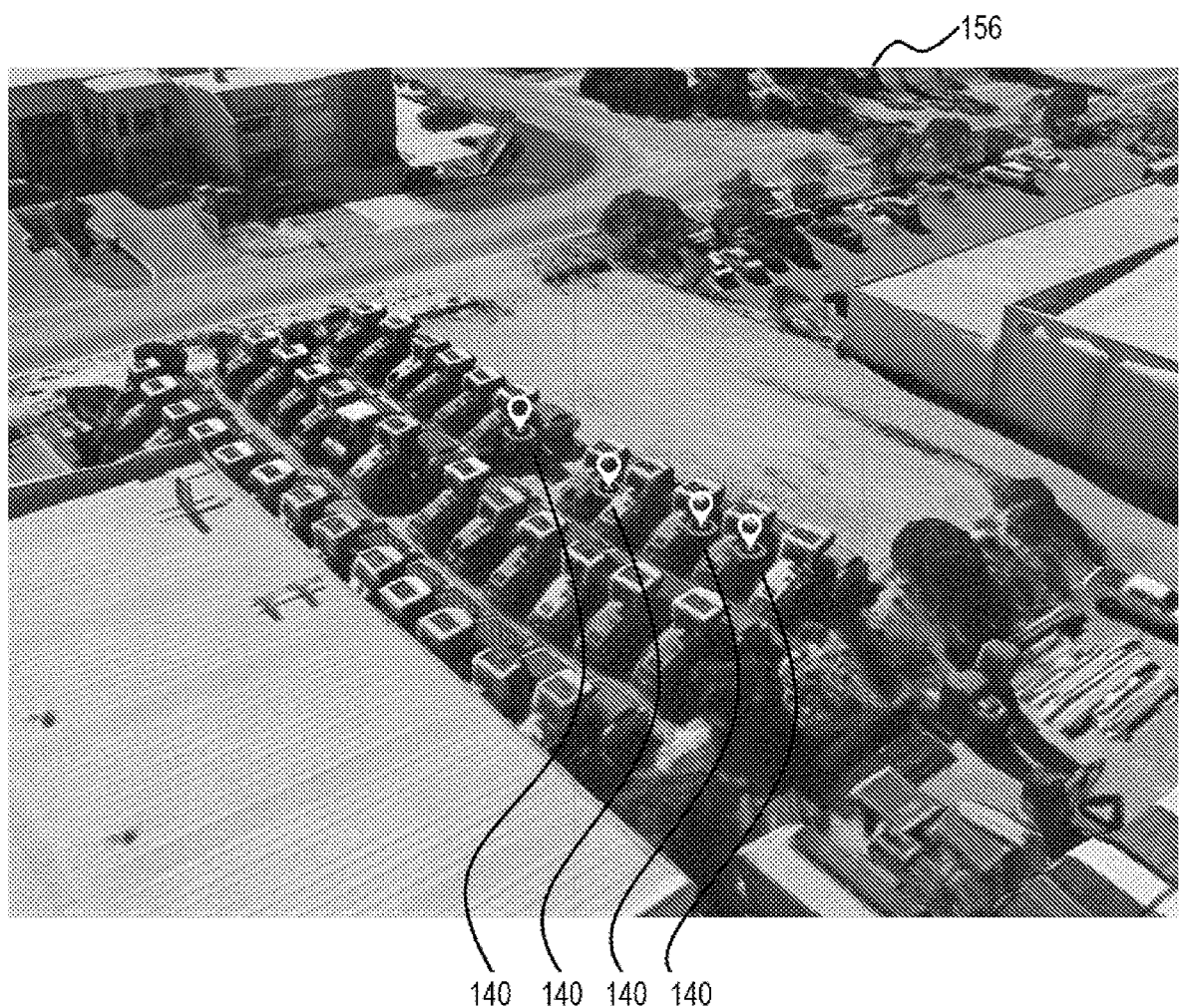
FIG. 7 depicts an example of a home representation for mobile assets view screen of the user interface generated and displayed via the display.

When it comes to the application of the FoundAt™ database of the store 114 to the management of mobile corporate assets, it is possible to represent these assets in any number of locations, including any particular timestamped location or a home location where all users can find the asset information should they require it. As an example, if a company runs a fleet of mobile equipment, they can set up a home location for each piece of equipment in a storage yard etc., with all relevant technical and service history records attributed to that asset. They could also fit a mobile tracker to the piece of equipment that shares any available operational data with the FoundAt™ database of the store 114, on the required frequency. In the future, a user can search all records for that particular piece of equipment, based upon its name or home location etc. They can also run a time based search query to look at the real/actual location of that piece of equipment at any particular point in time, along with any operational data that has also been tagged at that point in time. FIG. 7 of the drawings provides an indicative view 156, via the user interface 124, of a home location for a company's fleet of mobile equipment.

Figure 8:
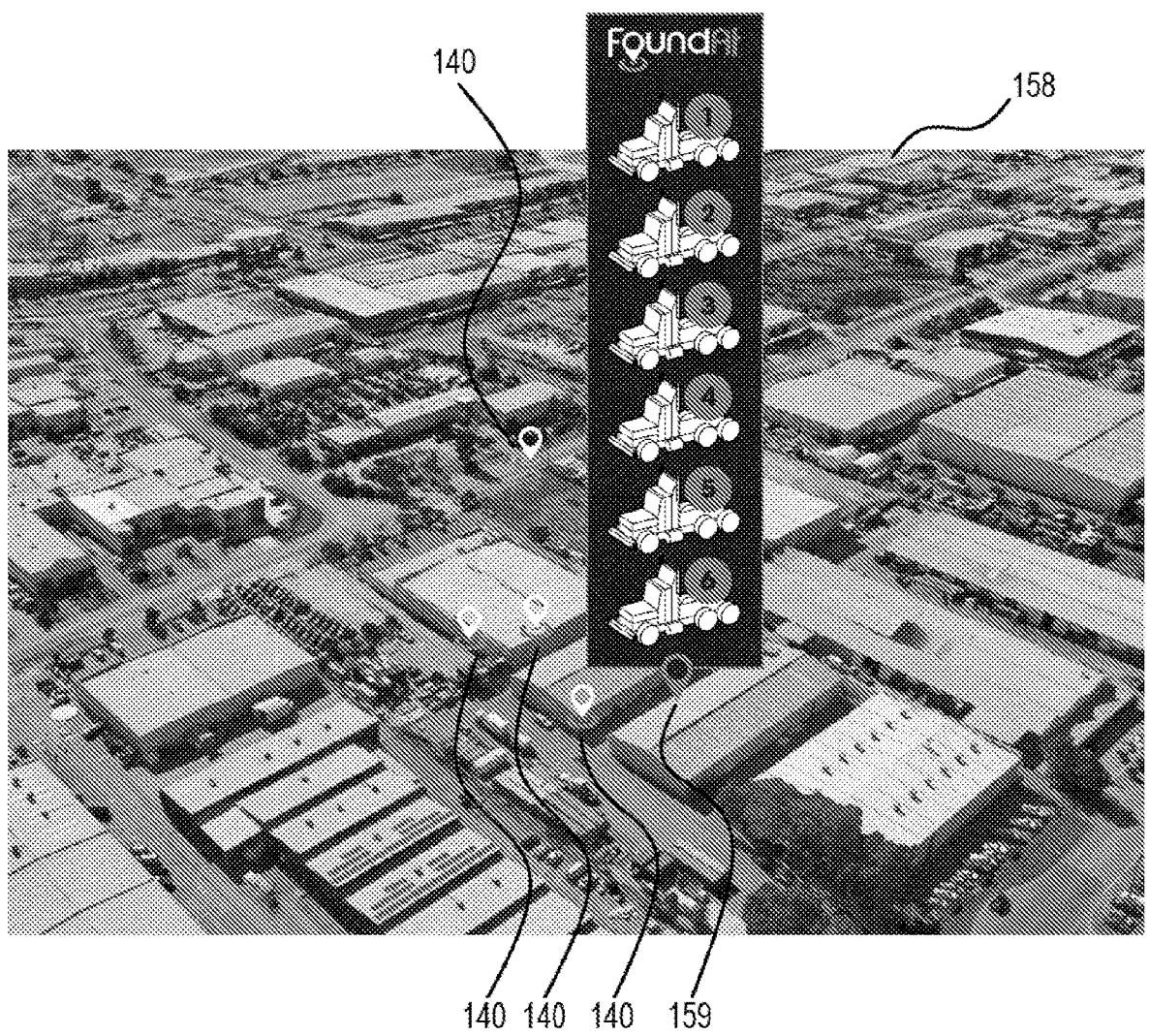
FIG. 8 depicts an example of assets stacked in the air in a virtual world view screen of the user interface generated and displayed via the display.

Another interesting aspect to the digital representation of the Earth of the embodiment of the invention, that can be described here, is the ability to place objects in the digital world in a manner that may not be possible on the real world. For example, the digital world need not be restricted to the laws of gravity or accessibility that exist in the real world. If a corporate user does not have a large enough physical plot of real estate to show all of their mobile assets in one location at the same time in the real world, that need not restrict their ability to do so in the digital world. For example, using the described embodiment of the FoundAt™ platform it is possible to stack their assets vertically in the air in the digital world. This still enables users to experience the same benefits with respect to spatial cognition and their ability to navigate to the exact location/asset that they are seeking, yet it also reduces the limitations of physical space that can be experienced in the real world. FIG. 8 of the drawings provides an indicative view of how a company is able to stack their assets 159 vertically in the virtual world using the FoundAt™ platform of the embodiment. It is worth noting that there are no real limitations to this and it may be possible to stack items possibly kilometres high (and in configurations other than vertical) in the virtual representation of the world of the FoundAt™ platform.

Figure 9A:
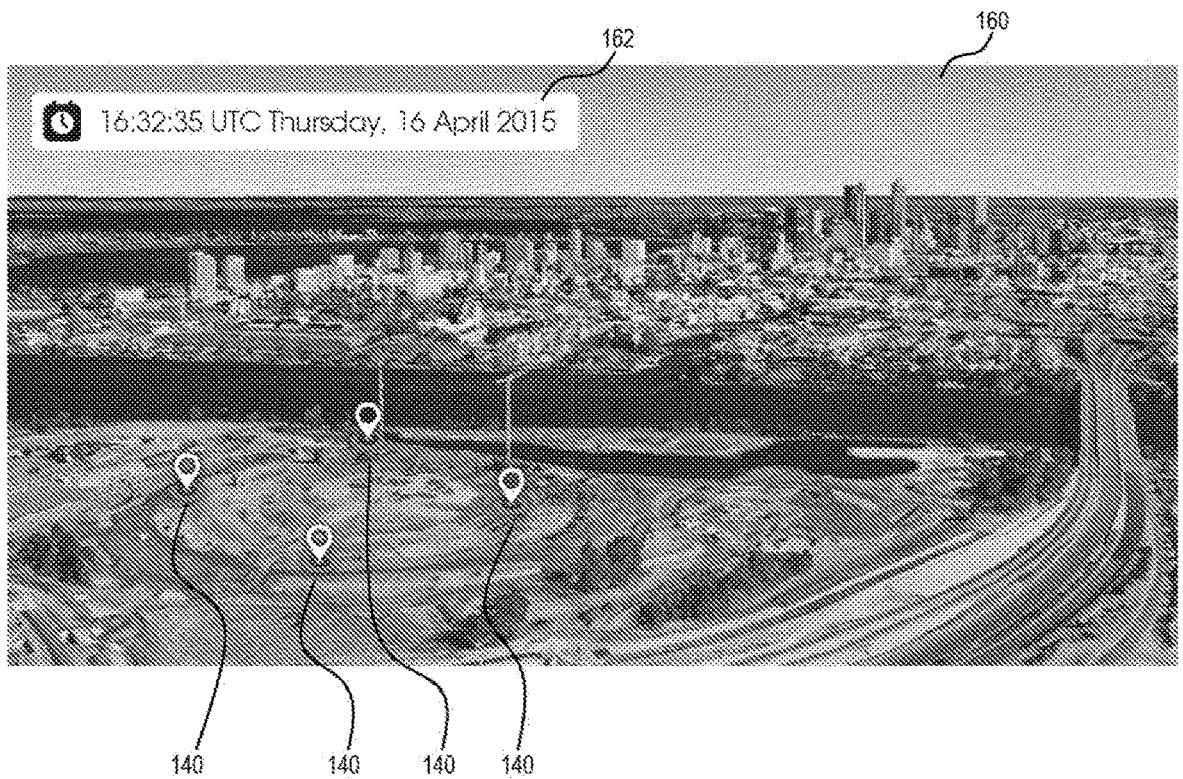
FIG. 9A depicts an example of old (past) imagery of a stadium on a view screen of the user interface generated and displayed via the display.
Figure 9B:
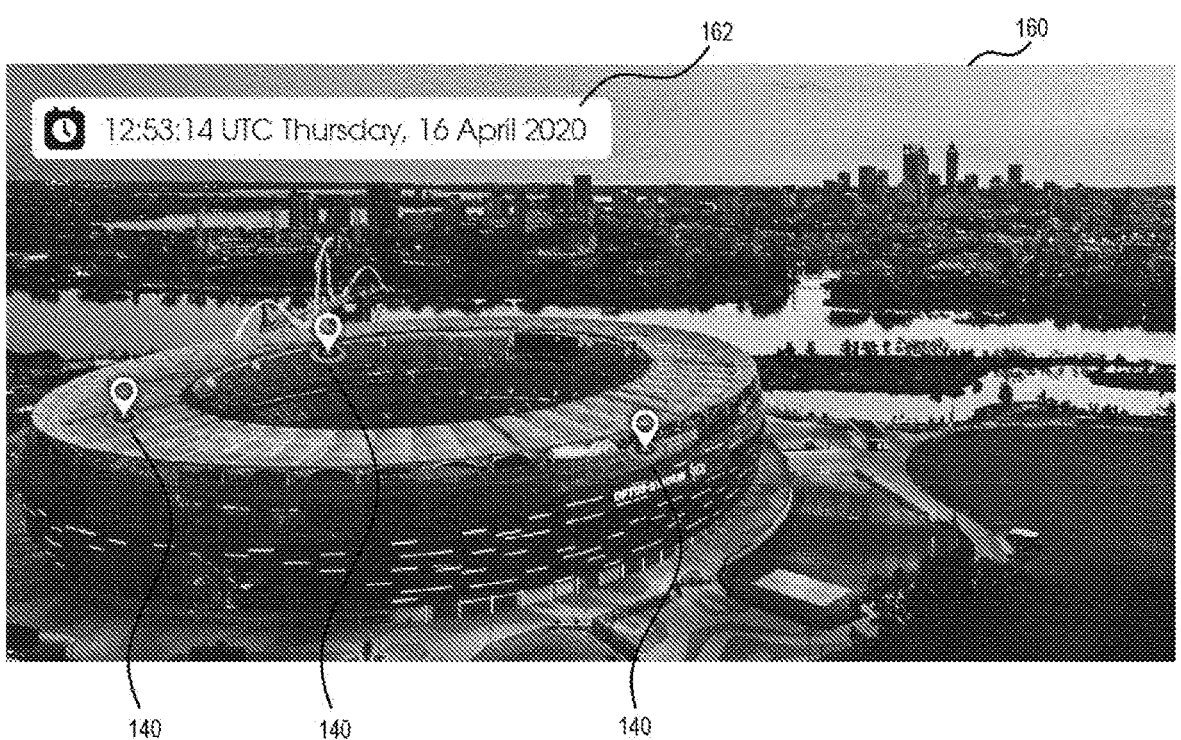
FIG. 9B depicts an example of current day (present) imagery of the stadium on a view screen of the user interface generated and displayed via the display.

One of the many layers available to the FoundAt™ database of the store 114 is that of time. This can be in the form of time stamped electronic files, such as photographs, documents or operational records etc., for example. The system 110 is operable so that it is possible to manipulate the virtual representation of the world of the FoundAt™ database of the store 114 to be reflective of the actual day and time that the record relates to. In embodiments, this may comprise showing (via the user interface 124) the closest available aerial imagery or satellite imagery that aligns with the requested date, or it could alternatively be photos from a fixed time lapse station or CCTV camera footage etc., or even 3D models representative of construction progress etc. at that time, for example. This can provide invaluable information related to specific data files as it enables the user 116 to consider other environmental factors that existed at the time at which an item of data was captured. To illustrate this further, consider an example whereby a large construction project may be underway and all data for geotechnical tests carried out in the soil etc, are captured and geo tagged within the FoundAt™ database of the store 114. In the future, if there are any structural issues in the finished construction that require investigation, the system 110 is operable to make it possible for the user 116 to not only search for the geotechnical tests by geographical location etc., it makes it possible to view these data points with aerial imagery that is relevant to that point in time (i.e. during earthworks) or the same data points can also be overlaid with current day aerial imagery that shows the location of those data points with respect to the current day structure, so that engineers or other suitable workers can relate any possible influence of the geotechnical conditions over the current day issue that they are experiencing. FIG. 9A indicates such a situation screen 160 at a time 162 in the past during the earthworks for a new stadium. FIG. 9B shows the same data points 140 overlaid with current day aerial imagery.

The present example also helps demonstrate some of the benefits that the FoundAt™ platform of the embodiment has over Digital Twin and BIM software etc. in that the allocation of data to global coordinates can occur at any point in time and is not reliant upon the development of a 3D model etc. to attribute data to. In fact, the very early stages of construction activities often commence whilst such models are still subject to significant change. As a result, Digital Twin and BIM software is sometimes not implemented and available for use until the construction has already progressed somewhat, losing the opportunity to capture construction records accurately within the model.

Another important feature of the FoundAt™ database of the store 114 of the embodiment is that it can also function like any other cloud based storage such as Microsoft's OneDrive or Google Drive etc. by allowing users to switch via the user interface 124 to a traditional electronic filing structure view, which can also sync with the files on a user's computer etc.

Within this view, it can also be possible for the user 116 to assign GRI to any file or folder etc. For instance, if a user 116 has a folder dedicated to a particular site project, they can assign geographical coordinates to that folder that also correlate to the site location. In the future, should the user 116 wish to find any files relating to that project, they can either navigate their way to the folder through the traditional filing structure, or alternatively, they can switch to the Global View using the user interface 124 within the FoundAt™ app and go to the geographical location for that project, in order to find the files. The system 110 is also operable to enable automatic filing of any data into folders associated with a particular geographical location. In this example, say for instance that the user 116 attended the site and took photographs and sent an email etc, relating thereto, then the system 110 is operable to automatically save the photos and email in the project folder, given that these files were generated within the geographical location assigned to that folder. This is where significant value can be realised by companies using the FoundAt™ platform of the embodiment, in that it helps ensure (or at least mitigates or reduces the risk) that they do not lose any data.

Benefits arise from integration of the FoundAt™ platform with social media platforms, given the significant traffic that may utilise the FoundAt™ platform for an improved user experience with their preferred social media platforms. The FoundAt™ platform also offers the convenience of being able to view multiple social media feeds, in the one location. For instance, the system 110 is operable to allow user 116 to be able to view feeds from their Facebook, Twitter, Instagram and LinkedIn accounts, all from the same home screen of the user interface 124 in the FoundAt™ application. In addition to this, the user 116 also benefits from the features built into the FoundAt™ platform, such as the ability to view the geographical location of any posts that they desire, or the ability to utilise the Augmented Reality feature within the FoundAt™ platform, to view social media posts in the physical location around the user.

The above and other features and advantages of embodiments of the invention will now be further described with reference to demonstrations of the system 110 in use, with reference to FIGS. 10 and 11 of the drawings.

Figure 10:
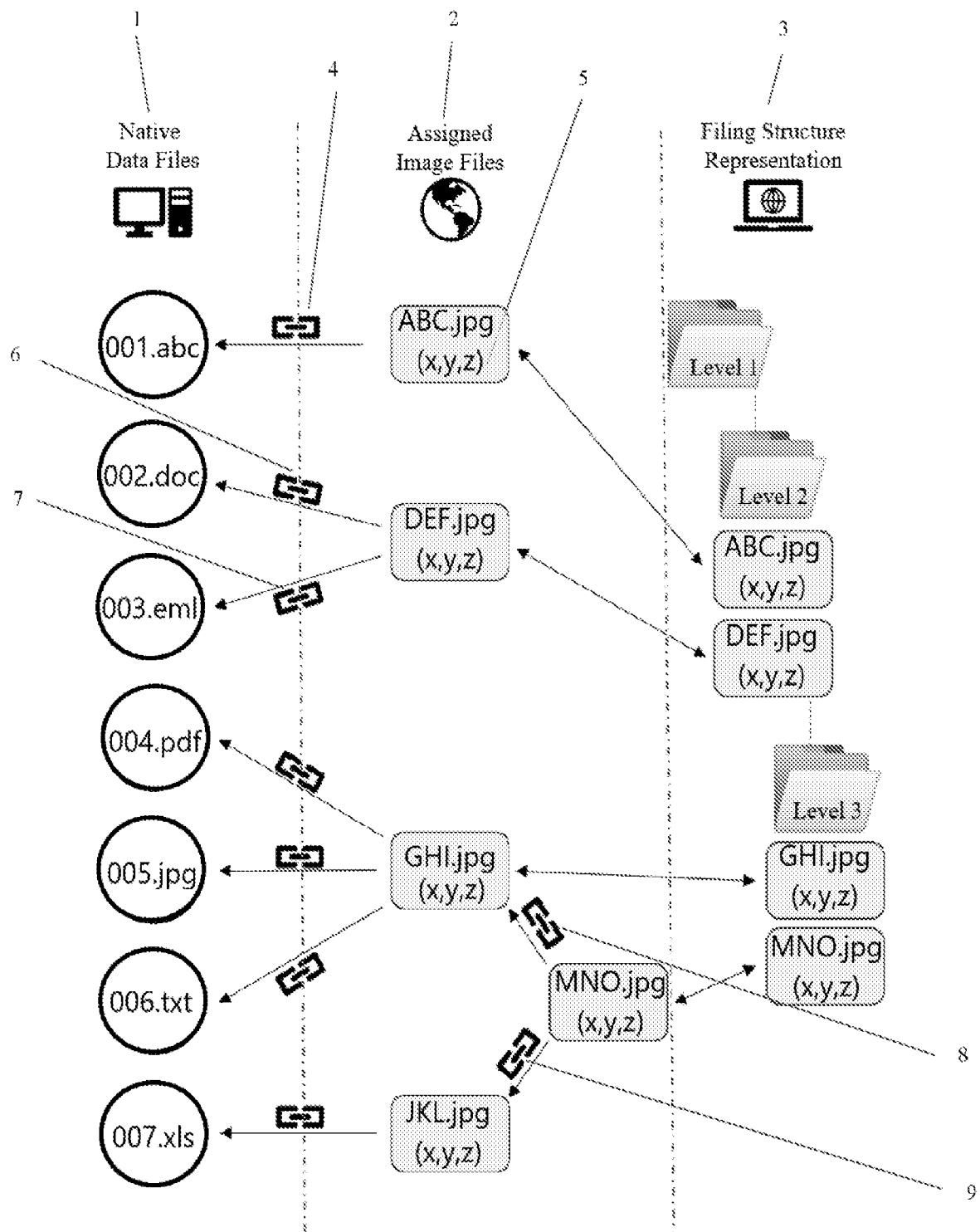
FIG. 10 depicts one diagrammatic example of how multiple file types can be assigned Geographical Reference Information (GRI) and stored within a database associated with the device of FIG. 1.

FIG. 10 of the drawings depicts one diagrammatic example of how multiple file types can be assigned GRI and stored within a database of the store 114 associated with the device of 112.

In reference to FIG. 10, it can be seen that at least one, and indeed any number of, Native Data Files (1) can be stored within the central database of the store 114 in their native format and can be comprised of any electronic file type, regardless of whether or not that file type supports GRI. All Native Data Files (1) can then have at least one, and indeed any number of, Assigned Image Files (2), which can also be used for the purpose of presenting the Assigned Image Files (2) within a typical Filing Structure Representation (3). The Assigned Image Files (2) are linked to each individual Native Data File (1) via a hyperlink (4). Each Assigned Image File (2) contains Geographically Referenced Information (5), which, in this example, is shown in the x,y,z format.

It can be seen within FIG. 10 that at least one, and indeed any number of, Native Data Files (1) can be assigned to an Assigned Image File (2), or the converse is also true whereby any number of Assigned Image Files (2) can be linked to each Native Data File (1). Taking the example of the Assigned Image File (2) denoted by "DEF.jpg", it can be seen that this particular Assigned Image File (2) is actually linked to two separate Native Data Files (1), denoted as "002.doc" and "003.eml" via two separate hyperlinks (6) and (7).

FIG. 10 also demonstrates that multiple layers of Assigned Image Files (2) can exist. This can be seen where the Assigned Image File (2), denoted by "MNO.jpg" has hyperlinks 7 and 8 that each point to other Assigned Image Files (2) that are denoted by "GHI.jpg" and "JKL.jpg" respectively. For example, if the user selects "GHI.jpg", they are linked to the Native Data Files (1) denoted by "004.pdf", "005.jpg" and "006.txt". However, should the user select "MNO.jpg", this will link the user to both "GHI.jpg" and "JKL.jpg", which in turn links the user to the Native Data Files (1) denoted by "004.pdf", "005.jpg", "006.txt" and "007.xls".

Figure 2:
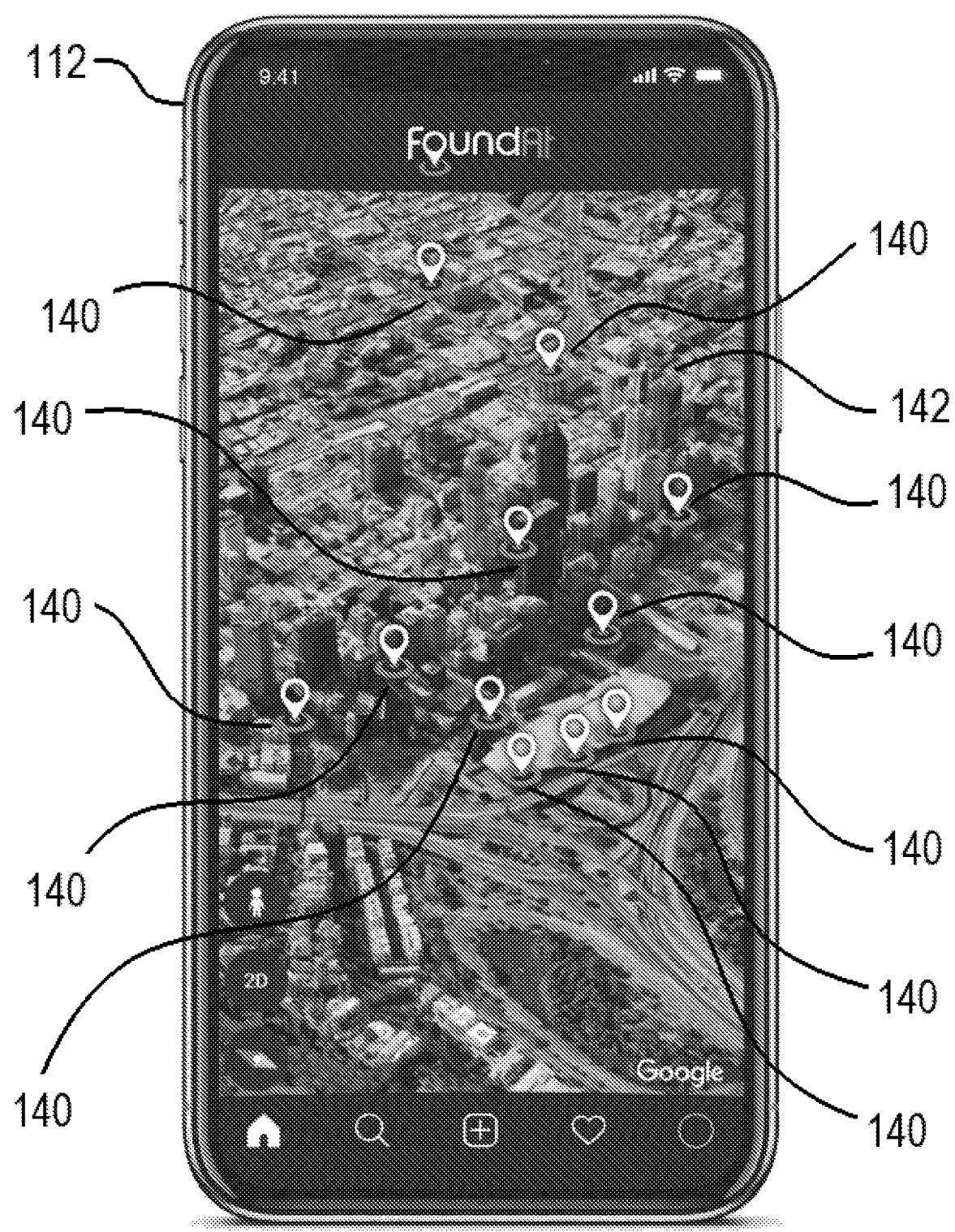
FIG. 2 depicts an example of a typical view of a 3D city location search results view screen of a user interface generated and displayed via a display of the device of FIG. 1.

As demonstrated in FIG. 10, the Assigned Image Files (2) can be presented within a Filing Structure Representation (3). This Filing Structure Representation (3) can be presented in any structure desired. In this example, FIG. 2 depicts the filing structure as a typical multi layered folder structure with folder icons "Level 1", "Level 2" and "Level 3". The user 116 is able to navigate this folder structure, using the user interface 124 of the system 110, as they would any other similar folder structure and by clicking on the representation of the Assigned Image Files (2), they are linked to the associated Native Data Files (1). This has the technical advantage of permitting dramatically reduced overall data storage volumes by having multiple locations at which any one particular Assigned Image File (2) is stored within the Filing Structure Representation, whilst all pointing to the same Native Data File (1). As such, it is not necessary to replicate any particular Native Data File (1) in order to have it featured at multiple locations within the Filing Structure Representation. Furthermore, deletion or relocation of a particular Assigned Image File (2) within the Filing Structure Representation (3) need not adjust the particular Native Data File (1), to which the Assigned Image File (2) is linked.

Figure 11:
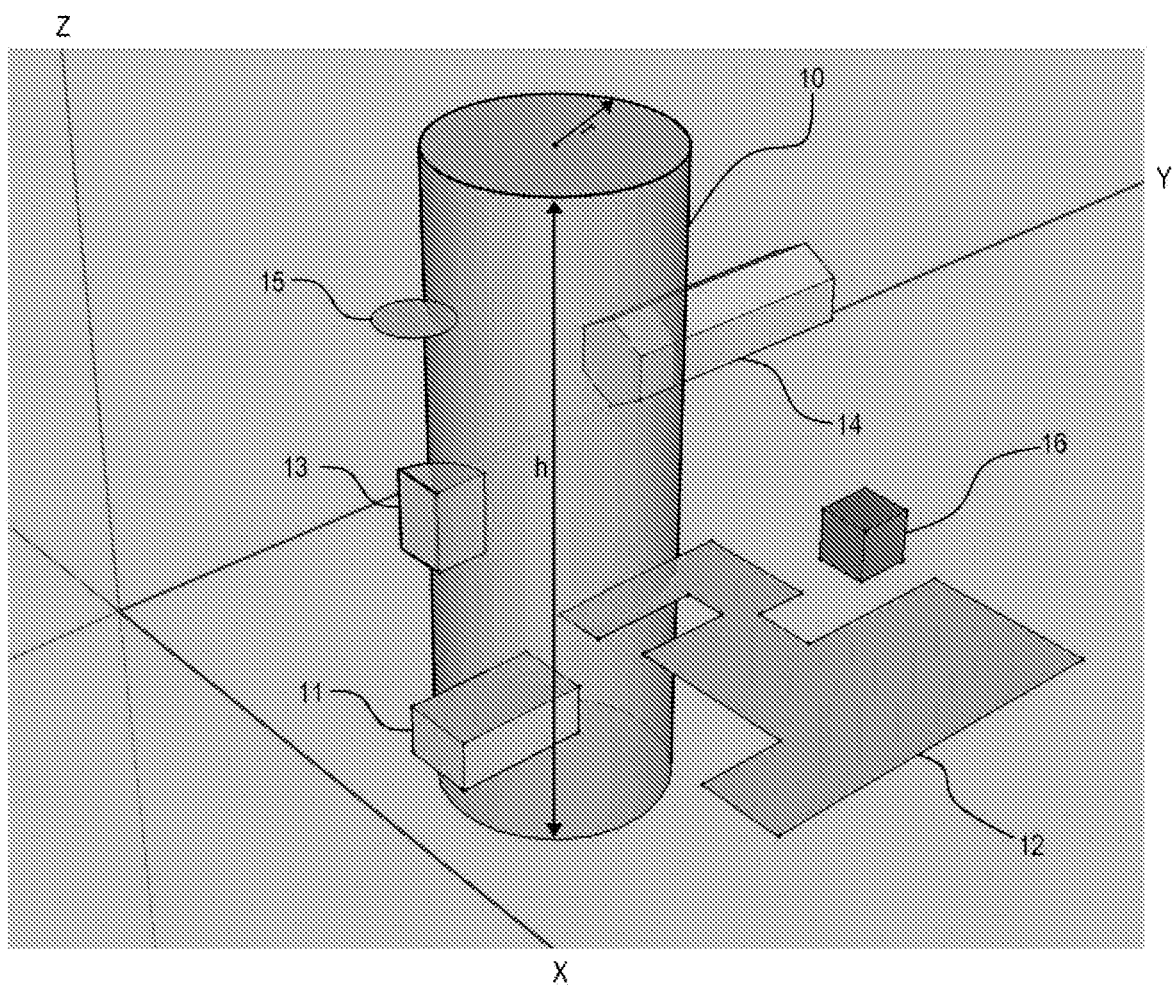
FIG. 11 depicts a demonstrative example of how a search can be filtered through the application of a single Geographical Search Parameter (GSP), with multiple data records and associated Geographical Reference Information (GRI) using the device of FIG. 1.

FIG. 11 depicts a demonstrative example of how a search can be filtered through the application of a single Geographical Search Parameter (GSP), with multiple data records and associated Geographical Reference Information (GRI) using the device 112.

Particularly, FIG. 11 shows a Geographical Search Parameter (GSP) (10), which in this instance is in the form of a cylinder that has been generated with a radius (r) and a height (h). It can be seen that this GSP (10) is located within a coordinate system that consists of an x, y and z axis. The GSP (10) intersects to varying degrees with a plurality of Geographical Reference Information (GRI) (11), (12), (13), (14) and (15). However, it can also be seen that the GSP (10) does not intersect at any point with the Geographical Reference Information (GRI) that is depicted by shape number (16). Therefore, the application of GSP (10) to a database search returns the dataset identified by the GRI (11), (12), (13), (14) and (15) but does not return a successful result for GRI (16).

Localised Calibration Tool/Method

The described embodiment of the present invention advantageously allows for determining the accurate geographic location of a personal mobile device (the device 112), for the purposes of both conducting a geo-based search (for a particular georeferenced item in the store 114) or for the creation of a new data file with accurate geo tag information (i.e. a new georeferenced item in the store 114).

As hereinbefore described, determining an accurate geographic location of a personal mobile device can often be problematic in complex industrial environments as GPS signals are not reliable inside a structure and other forms of location services, such as Bluetooth Beacons and WIFI location, can also be unreliable, especially if there is a lot of steel, etc. that is reflecting signals etc.

An aspect and embodiment of the present invention addresses this by providing a localised calibration tool that is operable to make it quick and simple to accurately locate the user's personal mobile device (device 112) within a global coordinate system (comprising measures of latitude, longitude and height relative to sea level in the embodiment, but which may be any coordinate system, including Geocentric Datum of Australia (GDA2020), for example, in other embodiments), so that inertia based location services (such as the NAVISENS API used in the FOUNDAT™ app) can then accurately track the location of the mobile device based upon the relative movement of the user 116 (and their device 112) from a calibration point.

In the embodiment, the system 110 comprises a calibration point in the form of a marker (different to indicator or marker 140 hereinbefore described) installed or otherwise placed or positioned at a physical location, the marker comprising geographical information identifying the physical location, wherein the at least one processor is further operable, under control of the electronic program instructions, to: receive input comprising the geographical information, and process the input to determine the GRI. The geographical information may relate to a global coordinate system, and may be in the form of measures of one or more of latitude, longitude, and height relative to sea level to specify the physical location. The geographical information may be embedded in the marker. The input means may be operable to read or otherwise communicate with the marker to receive the geographical information as input therefrom.

Particularly, in the embodiment, the localised calibration tool works by holding or embedding accurate latitude, longitude and height information in a marker that is installed in the relevant building structure and providing a means to quickly convey or communicate this information to the personal mobile device (device 16), such as through a QR code or Near Field Communication (NFC) chip etc. For example, if the chosen form of localised calibration tool was a QR code, user 116 may hold the camera of the set of sensors 136 of their personal mobile device (device 112) up to the QR code, allowing it to accurately read the current latitude, longitude, height and directional facing of the personal mobile device (device 112). If the user 116 then walks away from the localised calibration tool (at what may be considered to be a first, or initial, position) in order to take a photograph with accurate geo tag information to create a new georeferenced item for the store 114, the accelerometer and gyroscope of the set of sensors 136 installed within the personal mobile device 116, are operable to enable the device 112 to approximate the final location (which may be considered to be a second, or final, position) of the device 112 at the time of taking the photograph, via the information gathered from the acceleration and rotation of the personal mobile device 116 during its movement from the marker.

It can be appreciated that this is an embodiment of a method for determining a position of a mobile device, the mobile device firstly at or near a marker installed at a physical location, the marker comprising geographical information identifying the physical location, and the mobile device secondly moved away from the marker, the method comprising: storing electronic program instructions for controlling at least one processor; and controlling the at least one processor via the electronic program instructions to: when the mobile device is at or near the marker, receive and process input comprising the geographical information to determine a first position of the mobile device; when the mobile device is moved away from the marker, receive input comprising sensed movement of the device from the first position; and process the sensed movement to determine a second position of the mobile device, relative to the first position, on the basis of the input sensed movement.

In embodiments of the invention, the QR code may have a unique serial number/identifier code that, when scanned, the FoundAt™ app communicates back to the central database of the store 114 to obtain the geographic coordinates for the QR code. Additionally, and/or alternatively, the actual coordinates themselves could be communicated directly via the imbedded information in the QR code.

Other possible means of achieving this could be via communication with an NFC chip installed in the environment. For example, the user 116 holds their phone (device 112) up to the chip and it communicates via NFC to the users 116 phone device 112) and calibrates its location.

Another possible means is via utilising the API for the What3Words app and allow a user 116 to either manually enter the 3 words for that geographical location, or scan them using OCR, or imbed them in a QR code/NFC chip etc.

It should be appreciated that embodiments of the invention will work without the location of the personal mobile device being more accurately determined than is able to be done typically by conventional means, but the user experience may diminish if items do not show correctly in their location.

Method for the Geo Location of Augmented Reality Anchors

Once a personal mobile device has obtained an accurate geo location from the localised calibration tool (LCT) hereinbefore described, the system 110 is operable to correlate the accurate geo location of the LCT to a 3D mesh surrounding the LCT or to a 3D mesh at a nearby location that the user 116 may walk to after calibrating their device 112 at the LCT, by approximating the geo location of each node within the 3D mesh in relation to the geo location of the personal mobile device 112 that is creating the 3D mesh. Once all nodes within the 3D mesh have an accurate geo location, the system 110 is operable to place an AR anchor within the 3D mesh, thereby generating an accurate geo location for that AR anchor. Typically, such location accuracy (obtained by use of the embodiment of the invention) could be within +/−1 m, addressing the technical problem hereinbefore described of AR anchors being incorrectly displayed within environments that gave a similar geometric structure, in a nearby location, such as stairwells and isles in warehouses and supermarkets etc. Alternatively, when an accurate geographic location can be obtained on the personal mobile device 112 in any indoor environment etc., it is possible to place an AR anchor purely within the global coordinate system, without having to link it to a 3D mesh at all.

Another use for the calibration of a 3D mesh, in embodiments of the invention, include the use or application of that mesh to create a dimensionally accurate 3D map or structure of an internal space, by utilising the approximated geo location of each node within the 3D mesh, thereby advantageously avoiding the need for traditional survey methods, etc., to physically map an internal space.

It will be appreciated that the described embodiment of the invention provides several advantages as highlighted and described earlier herein.

The digital platform of embodiments of the invention offers a new approach to the integration of all forms of electronic data into a single database, that provides improvements in transparency, accessibility and user experience. In embodiments, it transforms the way all data is managed, whether it be on the smallest scale for individual/private users or on a largest scale for global corporations.

Embodiments of the invention aim to consolidate and integrate all such data, bringing significant opportunity to grow and evolve our digital world.

True integration sought to be provided by embodiments of the invention facilitates the unlocking of the ultimate potential of the data that we store and use every day. As the volumes of data continue to grow at ever increasing rates, it is important that humans do not get left behind and that the data that we rely upon becomes more intuitive and natural to interact with. It is here that embodiments of the invention excel as one of the principals upon which it is founded is to tap in to the human ability to use spatial cognition to navigate the world around them and bring this same concept to the way in which we navigate the digital world. Embodiments of the invention are operable to seamlessly blend the real-world environment that users live in every day, with that of the digital world (around them). This not only advantageous improves the ability of users to manage their data but it also opens up some tremendous opportunities for the way they interact not only with other human beings, but also with corporations and government entities that form an integral part of society.

The described embodiments of the present invention overcome many of the problems associated with existing databases and search engines in two main ways. Firstly, during the acquisition or generation of the data, the system 110 is operable to automatically assign geographical positioning data for all data and file types. This may be through the addition of the data within the existing file type, where supported, or through the referencing of an associated file type that does allow the geographical information to be embedded. In addition to the automatic generation of the Geographical Reference Information (GRI), the system 110 of the embodiment of the present invention is also operable to enable this data to be semi automatically assigned, through the use of predetermined rules etc., or manually assigned via user input, or a combination of all of these methods. The GRI itself can also be in multiple forms, such as an individual point located according to any number of local or global coordinate systems, most likely utilizing some form of x, y and z location, such as longitude, latitude and elevation. Alternatively, the GRI could also be in form of any One Dimensional (1D), Two Dimensional (2D) or Three Dimensional (3D) shape file. This advantageously ensures that any future search queries that are raised based upon geographical location, may locate the file in question through intersecting with the point, 1D, 2D or 3D GRI, even if the search field does not intersect with the individual point of generation or acquisition. The data within the database of the store 112 of the embodiment can also co-exist in both a traditional electronic filing structure, as well as the geographically referenced form, allowing for multiple ways of filing, viewing and searching for the data.

A second way that the described embodiments of the present invention overcome many of the problems associated with existing databases and search engines, is by allowing the inclusion of geographically referenced parameters within the search criteria. Similar to the way in which the GRI is stored, the Geographical Search Parameters (GSP) can be in any number of forms, such as a single point located in space, possibly with an allowed tolerance or radius around that point to take into consideration factors such as the accuracy of location at the time of generation or acquisition. The GSP may also be in the form of any 1D, 2D or 3D shape file. By providing the GSP with the search query input via the user interface 124, the user 116 is able to limit the number of results of that query, to only data points that exist either within, or outside of, those geographical bounds. In effect, the search results may reflect the intersection of the GSP with any individual GRI's that exist within that space. In addition to the GSP, the user can apply any traditional search criteria, such as text in a field, date of creation, file type or username etc. as input via the user interface 124. When determining what GSP should be applied to a search query, the user 116 may be guided by overlaid information such as aerial imagery or possibly even 3D electronic models etc., operatively generated and displayed via the user interface 124, to help the user 116 ensure that the GSP are suitable for the information that they wish to find.

There are a wide variety of other benefits offered by this approach to the storage and retrieval of data, such as the possibility of enabling owners or administrators to authorize or manage all data generation or acquisition within certain geographical locations or local area networks. The present invention, in embodiments, can also facilitate the viewing of data from within a Virtual Reality (VR) type interface, whereby a user can virtually explore a geographical region, and the data contained within, from an alternate location. Similarly, the present invention, in embodiments, can also be utilized for the purposes of presenting a live stream of various data types as a user moves through a real-world environment, via an Augmented Reality (AR) type interface. Another advantage of embodiments of the present invention is that it enables users to digitally retrace their steps, to find data that they acquired at a given location and point in time. If the user is unable to find the file that they are seeking, for any number of reasons, such as incorrect filing, accidental deletion etc., the user, via the system 110, is able to go back to the geographical location that they generated the file at, to find it. The present invention, in embodiments, also makes it possible to include the ability to remotely place data at a given geographical location. This may be via either a manual or automatic process and possible applications include ensuring the security of an individual's data, whereby they may wish to share a file but not show the exact location of data generation or acquisition. Instead of showing the actual location where the file was generated, the system 110 is operable to show a representation at a geographical location that has some relation to the individual but not necessarily disclose personal information such as their residential address etc. Another advantage of embodiments of the present invention is that users that wish to geographically locate information will also not be limited to a location that they can physically access on the surface of the earth etc. For instance, the system 110 may provide a user with the ability to save data at the same latitude and longitude but alter the height above (or indeed below) the earth that it appears, so as to effectively increase the geographical area available to represent data.

Embodiments of the invention provide an alternate approach to traditional BIM/Digital Twin platforms, etc. by locating information purely in the geo coordinate system and not attributing data to elements within 3D models etc.

Embodiments of the invention address the shortcomings of existing BIM/Digital Twin platforms, being far cheaper and quicker for companies to implement and commence using. This not only benefits companies that had already been considering implementation strategies for BIM/Digital Twin platforms, but it also makes it possible for companies that would have not ordinarily considered adopting such technologies, to do so and realise all of the available benefits, no matter what industry they are operating in.

Embodiments of the invention may make world scale AR truly possible through the highly accurate geographically referenced database of the store 114. No longer will AR be confined to relatively small environments that current technologies require in order to maintain the accuracy in calibration required for truly immersive AR experiences. Embodiments of the invention make this possible on a global scale and as a result of doing so, may also encourage consistency in terms of the platform used to enjoy AR content, as users move through a range of environments or industry sectors and rely upon embodiments of the invention their AR needs.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

The present application claims priority from Australian Provisional Patent Application No. 2019903823, the contents of which are incorporated herein by reference in their entirety.

The claims defining the invention are as follows:

1. A system for geographically referencing an item comprising:
   at least one processor;
   storage storing electronic program instructions for controlling the at least one processor; and
   an input means including at least one sensor for obtaining a geographical information input;
   wherein the at least one processor is operable, under control of the electronic program instructions, to:
   make a file to be added to a store searchable by geographical reference information (GRI), thereby creating a georeferenced file,
   wherein the system is implemented in a mobile device comprising said input means, and
   wherein the at least one processor is operable, under control of the electronic program instructions, to subject the geographical information input from the at least one sensor of said input means to a calibration process to correct error in the geographical information input from the at least one sensor of said input means and determine the GRI of the file to be added to the store based on the calibration process,
   wherein to make the file searchable by GRI, the at least one processor is further operable, under control of the electronic program instructions, to:
   determine whether the file can or cannot hold GRI; and if it is determined that the file can hold GRI, add GRI to the file to create a georeferenced file, and
   wherein if it is determined that the file cannot hold GRI, then the at least one processor is further operable, under control of the electronic program instructions, to: form an association between the file and an item that can hold GRI, and then add GRI to the item to create the georeferenced file.

2. A system according to claim 1, wherein to make the file searchable by GRI, the at least one processor is further operable, under control of the electronic program instructions, to: add the file to the store and insert the GRI for the file into a field within the store; and/or add the file to a store and link the GRI to the stored file.

3. A system according to claim 2, wherein the store comprises object storage for unstructured data, and the at least one processor is operable, under control of the electronic program instructions, to: save the file in the storage and then insert the GRI into a field within a database of the storage; and/or save the file in the storage and then link the GRI to the saved file.

4. A system according to claim 1, wherein the at least one processor is further operable, under control of the electronic program instructions, to: add the georeferenced file to a store, wherein the georeferenced file is searchable in the store via the added GRI.

5. A system according to claim 4, wherein the store comprises a database.

6. A system according to claim 1, wherein the making occurs on or after creation of the file, and the GRI comprises information identifying a physical location and/or time of creation of the file.

7. A system according to claim 1, wherein the file is an electronic, digital, or virtual file, comprising one or more of: an email; an image; a social media post; a document; a record of an electronic transaction; and a link to a file in an external database.

8. A system according to claim 1, wherein adding the GRI comprises applying the GRI, which may comprise applying one or more of single point geographical reference data but also complex 2D and 3D shape files to each file.

9. A system according to claim 8, when dependent on claim 5, wherein geographical searching is carried out based upon the intersection of GRI and GSP.

10. A system according to claim 1, wherein the georeferenced file is searchable in the store by a search query, which may comprise one or more geographical search parameters (GSP).

11. A system according to claim 10, wherein the GSP includes one or more of single point geographical reference data and complex 2D and 3D shape files.

12. A system according to claim 1, wherein the at least one processor is further operable, under control of the electronic program instructions, to: generate and display via a display a user interface operable to allow a user to control the input means to capture input comprising data and/or information.

13. A system according to claim 12, wherein said at least one sensor is part of a sensor system or a set of sensors.

14. A system according to claim 13, wherein individual sensors within the set of sensors comprise one or more of: a motion sensor; a gyroscope sensor; a gravity sensor, an infra-red sensor; a depth sensor; a three dimensional imaging sensor; an inertial sensor; a Micro-Electromechanical (MEMS) sensor; an imaging means; an acceleration sensor; an orientation sensor; a direction sensor; a position sensor; a light source sensor; a sound recording means.

15. A system according to claim 1, further comprising a marker installed at a physical location, the marker comprising geographical information identifying the physical location; and wherein said calibration process comprises operating the input means to read or otherwise communicate with the marker to receive the geographical information from the marker as a further geographical information input which is processed by the at least one processor to correct error in the geographical information input from the at least one sensor and determine the GRI of the file.

16. A system according to claim 15, wherein the geographical information input relates to a global coordinate system and is in the form of measures of one or more of latitude, longitude, and height relative to sea level, and/or other datum or coordinate system, to specify the physical location.

17. A system according to claim 15, wherein the geographical information is embedded in the marker.

18. A system as claimed in claim 15, further comprising a mobile device, wherein the at least one processor is controllable via the electronic program instructions to:
when the mobile device is at or near the marker, receive and process input comprising the geographical information to determine a first position of the mobile device;
when the mobile device is moved away from the marker, receive input comprising sensed movement of the mobile device from the first position; and
process the sensed movement to determine a second position of the mobile device, relative to the first position, on the basis of the input sensed movement.

19. A system according to claim 1, wherein the electronic program instructions comprise software.

20. A system according to claim 1, wherein operations performed by the system occur automatically, without requiring human intervention.

21. A method for geographically referencing an item for establishing an anchor for computer generated perceptual information, the method comprising:
storing electronic program instructions for controlling at least one processor;
obtaining a geographical information input from a mobile device comprising at least one sensor; and
controlling the at least one processor via the electronic program instructions, to:
make a file searchable by geographical reference information (GRI), thereby creating a georeferenced file to be added to a store,
wherein the at least one processor is controlled to subject the geographical information input to a calibration process to correct error in the geographical information input from the at least one sensor and determine the GRI of the file to be stored in the store based on the calibration process,
wherein to make the file searchable by GRI, the at least one processor is further operable, under control of the electronic program instructions, to:
determine whether the file can or cannot hold GRI; and
if it is determined that the file can hold GRI, add GRI to the file to create a georeferenced file, and
wherein if it is determined that the file cannot hold GRI, then the at least one processor is further operable, under control of the electronic program instructions, to: form an association between the file and an item that can hold GRI, and then add GRI to the item to create the georeferenced file.

22. A method according to claim 21, wherein, to make the file searchable by GRI, the method further comprises controlling the at least one processor via the electronic program instructions, to: add the file to the store and insert the GRI for the file into a field within the store; and/or add the file to the store and link the GRI to the stored file.

23. A method according to claim 22, wherein the store comprises object storage for unstructured data, and the method further comprises controlling the at least one processor via the electronic program instructions, to: save the file in the storage and then insert the GRI into a field within a database of the storage; and/or save the file in the storage and then link the GRI to the saved file.

24. A method according to claim 23, further comprising controlling the at least one processor via the electronic program instructions, to: add the georeferenced file to the store, wherein the georeferenced file is searchable in the store via the added GRI.

25. A method according to claim 21, wherein said calibration process comprises communication between the at least one processor and a marker installed at a physical location, the marker comprising geographical information identifying the physical location, said at least one processor receiving the geographical information from the marker as a further geographical information input which is processed to correct error in the geographical information input from the at least one sensor and determine the GRI of the file.

26. A method for geographically referencing an item by determining a position of a mobile device, the mobile device firstly at or near a marker installed at a physical location, the marker acting as an anchor for computer generated perceptual information and comprising geographical information identifying the physical location, and the mobile device secondly moved away from the marker, the method comprising:
storing electronic program instructions for controlling at least one processor; and
controlling the at least one processor via the electronic program instructions to:
make an item searchable by geographical reference information (GRI);
when the mobile device is at or near the marker, receive and process input comprising the geographical information through an input means to determine a first position of the mobile device;
when the mobile device is moved away from the marker, receive input comprising sensed movement of the mobile device from the first position; and
process the sensed movement to determine a second position of the mobile device, relative to the first position, on the basis of the input sensed movement,
wherein, with the mobile device at said second position, the GRI of the item is determined based on said second position,
wherein to make the item searchable by GRI, the at least one processor is further operable, under control of the electronic program instructions, to:
determine whether the item can or cannot hold geographical reference information (GRI); and
if it is determined that the item can hold GRI, add GRI to the item to create a georeferenced item, and
wherein if it is determined that the item cannot hold GRI, then the at least one processor is further operable, under control of the electronic program instructions, to: form an association between the item and an other item that can hold GRI, and then add GRI to the other item to create the georeferenced item.

27. A method according to claim 26, wherein said computer generated perceptual information is augmented or virtual reality.

28. A non-transitory computer-readable storage medium on which is stored electronic program instructions that, when executed by a computing means, causes the computing means to:
  make an item searchable by geographical reference information (GRI);
  when a mobile device is at or near a marker that (i) is installed at a physical location, (ii) acts as an anchor for computer generated perceptual information, and (iii) comprises geographical information identifying the physical location, receive and process input comprising the geographical information through an input means to determine a first position of the mobile device;
  when the mobile device is moved away from the marker, receive input comprising sensed movement of the mobile device from the first position;
  process the sensed movement to determine a second position of the mobile device, relative to the first position, on the basis of the input sensed movement; and
  with the mobile device at said second position, determine the GRI of the item based on said second position
  wherein to make the item searchable by GRI, the electronic program instructions further cause the computing means to:
    determine whether the item can or cannot hold GRI; and
    if it is determined that the item can hold GRI, add GRI to the item to create a georeferenced item, and
  wherein if it is determined that the item cannot hold GRI, then the electronic program instructions further cause the computing means to: form an association between the item and an other item that can hold GRI, and then add GRI to the other item to create the georeferenced item.

29. A non-transitory computer-readable storage medium on which is stored electronic program instructions that, when executed by a computing means, causes the computing means to:
  obtain a geographical information input from a mobile device comprising at least one sensor:
  subject the geographical information input to a calibration process to correct error in the geographical information input from the at least one sensor;
  determine geographical reference information (GRI) of a file to be stored in a store based on the calibration process;
  make the file searchable by GRI, thereby creating a georeferenced file to be added to the store,
  wherein to make the file searchable by GRI, the electronic program instructions cause the computing means to:
    determine whether the file can or cannot hold GRI; and
    if it is determined that the file can hold GRI, add GRI to the file to create a georeferenced file, and
  wherein if it is determined that the file cannot hold GRI, then the electronic program instructions cause the computing means to: form an association between the file and an item that can hold GRI, and then add GRI to the item to create the georeferenced file.

* * * * *